US012756450B2

(12) United States Patent
Park et al.

(10) Patent No.: US 12,756,450 B2
(45) Date of Patent: Oct. 6, 2026

(54) METHOD AND APPARATUS FOR BEAM MANAGEMENT IN COMMUNICATION SYSTEM

(71) Applicant: ELECTRONICS AND TELECOMMUNICATIONS RESEARCH INSTITUTE, Daejeon (KR)

(72) Inventors: Han Jun Park, Daejeon (KR); Heesoo Lee, Daejeon (KR); Yong Jin Kwon, Daejeon (KR); An Seok Lee, Daejeon (KR); Yun Joo Kim, Daejeon (KR); Hyun Seo Park, Daejeon (KR); Jung Bo Son, Daejeon (KR); Yu Ro Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 520 days.

(21) Appl. No.: 18/339,352

(22) Filed: Jun. 22, 2023

(65) Prior Publication Data

US 2023/0421238 A1 Dec. 28, 2023

(30) Foreign Application Priority Data

| | | |
|---|---|---|
| Jun. 24, 2022 | (KR) | 10-2022-0077672 |
| Jul. 8, 2022 | (KR) | 10-2022-0084069 |
| May 30, 2023 | (KR) | 10-2023-0069181 |

(51) Int. Cl.

| | |
|---|---|
| ***H04B 7/08*** | (2006.01) |
| ***H04B 7/06*** | (2006.01) |
| ***H04B 17/373*** | (2015.01) |

(52) U.S. Cl.

CPC ........... *H04B 7/088* (2013.01); *H04B 7/0626* (2013.01); *H04B 17/373* (2015.01)

(58) Field of Classification Search

CPC .... H04B 7/088; H04B 7/0626; H04B 17/373; H04B 7/0695

See application file for complete search history.

(56) References Cited

U.S. PATENT DOCUMENTS

| | | | | |
|---|---|---|---|---|
| 11,463,212 | B2 * | 10/2022 | Yu | H04L 5/0048 |
| 2020/0366340 | A1 * | 11/2020 | Zhang | H04B 7/0408 |

(Continued)

FOREIGN PATENT DOCUMENTS

| | | | |
|---|---|---|---|
| KR | 10-2154481 | B1 | 9/2020 |
| KR | 10-2020-0132114 | A | 11/2020 |

OTHER PUBLICATIONS

3GPP TS 38.211 V17.4.0 (Dec. 2022), 3rd Generation Partnership Project; Technical Specification Group Radio Access Network; NR; Physical channels and modulation (Release 17), pp. 1-136.

3GPP TS 38.212 V17.5.0 (Mar. 2023), 3rd Generation Partnership Project; Technical Specification Group Radio Access Network; NR; Multiplexing and channel coding (Release 17), pp. 1-203.

(Continued)

*Primary Examiner* — Harry H Kim

(74) *Attorney, Agent, or Firm* — Rabin & Berdo, P.C.

(57) ABSTRACT

A method of a terminal may comprise: receiving downlink reference signals from a base station; generating beam report information based on the downlink reference signals, and transmitting the beam report information to the base station; receiving, from the base station, beam prediction information based on the beam report information and valid time information on a valid time for the beam prediction information; and selecting a beam based on the beam prediction information and the valid time information, and using the selected beam.

14 Claims, 13 Drawing Sheets

(56) References Cited

U.S. PATENT DOCUMENTS

| | | | | |
|---|---|---|---|---|
| 2021/0006989 | A1 | 1/2021 | Lee et al. | |
| 2021/0110265 | A1 | 4/2021 | Reddiar et al. | |
| 2021/0409256 | A1 | 12/2021 | Lincoln et al. | |
| 2022/0116802 | A1 | 4/2022 | Kim | |
| 2022/0124807 | A1 | 4/2022 | Hu et al. | |
| 2022/0150129 | A1 | 5/2022 | Kim et al. | |
| 2022/0173866 | A1 | 6/2022 | Wang et al. | |
| 2022/0174641 | A1 | 6/2022 | Cha et al. | |
| 2022/0217748 | A1 | 7/2022 | Seo et al. | |
| 2023/0269816 | A1* | 8/2023 | Zhou | H04B 17/373<br>370/328 |
| 2025/0150119 | A1* | 5/2025 | Lee | H04B 17/309 |
| 2025/0192868 | A1* | 6/2025 | Li | H04L 5/0051 |
| 2025/0226956 | A1* | 7/2025 | Li | H04L 5/0053 |
| 2025/0286601 | A1* | 9/2025 | Zhang | H04W 16/28 |

OTHER PUBLICATIONS

3GPP TS 38.213 V17.5.0 (Mar. 2023), 3rd Generation Partnership Project; Technical Specification Group Radio Access Network; NR; Physical layer procedures for control (Release 17), pp. 1-262.

3GPP TS 38.214 V17.5.0 (Mar. 2023), 3rd Generation Partnership Project; Technical Specification Group Radio Access Network; NR; Physical layer procedures for data (Release 17), pp. 1-231.

3GPP TS 38.215 V17.3.0 (Mar. 2023), 3rd Generation Partnership Project; Technical Specification Group Radio Access Network; NR; Physical layer measurements (Release 17), pp. 1-26.

Ke Ma et al., "Deep Learning for Beam-Management: State-of-the-Art, Opportunities and Challenges", arXiv:2111.11177v2 [cs.IT], Dec. 12, 2021, pp. 1-6.

QUALCOMM, "New SI: Study on Artificial Intelligence (AI)/ Machine Learning (ML) for NR Air Interface", 3GPP TSG RAN Meeting #94e, RP-213599, Electronic Meeting, Dec. 6-17, 2021.

* cited by examiner

FIG. 15

| | |
|---|---|
| beam $B_1$ | valid time of beam $B_1$ |
| beam $B_2$ | valid time of beam $B_2$ |
| ⋮ | ⋮ |

FIG. 16

| | |
|---|---|
| valid time $T_1$ | beam for valid time $T_1$ |
| valid time $T_2$ | beam for valid time $T_2$ |
| ⋮ | ⋮ |

FIG. 17

| |
|---|
| beam $B_1$ and valid time $T_1$ |
| beam $B_2$ and valid time $T_2$ |
| ⋮ |

METHOD AND APPARATUS FOR BEAM MANAGEMENT IN COMMUNICATION SYSTEM

CROSS-REFERENCE TO RELATED APPLICATIONS

This application claims priority to Korean Patent Applications No. 10-2022-0077672, filed on Jun. 24, 2022, No. 10-2022-0084069, filed on Jul. 8, 2022, and No. 10-2023-0069181, filed on May 30, 2023, with the Korean Intellectual Property Office (KIPO), the entire contents of which are hereby incorporated by reference.

BACKGROUND

1. Technical Field

Exemplary embodiments of the present disclosure relate to a beam management technique in a communication system, and more specifically, to a beam management technique in a communication system, which facilitates application of a beam predicted by a base station and/or terminal.

2. Related Art

With the development of information and communication technology, various wireless communication technologies have been developed. Typical wireless communication technologies include long term evolution (LTE), new radio (NR), 6th generation (6G) communication, and/or the like. The LTE may be one of 4th generation (4G) wireless communication technologies, and the NR may be one of 5th generation (5G) wireless communication technologies.

For the processing of rapidly increasing wireless data after the commercialization of the 4th generation (4G) communication system (e.g., Long Term Evolution (LTE) communication system or LTE-Advanced (LTE-A) communication system), the 5th generation (5G) communication system (e.g., new radio (NR) communication system) that uses a frequency band (e.g., a frequency band of 6 GHz or above) higher than that of the 4G communication system as well as a frequency band of the 4G communication system (e.g., a frequency band of 6 GHz or below) is being considered. The 5G communication system may support enhanced Mobile BroadBand (eMBB), Ultra-Reliable and Low-Latency Communication (URLLC), and massive Machine Type Communication (mMTC).

Meanwhile, researches on applying artificial intelligence (AI) and machine learning (ML) technologies to mobile communication are actively underway. In particular, a method of predicting an optimal beam in a millimeter band based on AI/ML is being studied. However, in such the beam prediction method, it may not be clear about a time point at which a base station and a terminal apply beam information predicted based on AI/ML.

SUMMARY

Exemplary embodiments of the present disclosure are directed to providing a method and an apparatus for beam management in a communication system, which facilitates application of a beam predicted by a base station and/or terminal.

According to a first exemplary embodiment of the present disclosure, a method of a terminal may comprise: receiving downlink reference signals from a base station; generating beam report information based on the downlink reference signals, and transmitting the beam report information to the base station; receiving, from the base station, beam prediction information based on the beam report information and valid time information on a valid time for the beam prediction information; and selecting a beam based on the beam prediction information and the valid time information, and using the selected beam.

The beam prediction information may include information indicating a receive beam of the terminal in the valid time, or information indicating a transmit beam of the base station and a receive beam of the terminal corresponding to the transmit beam in the valid time.

The beam prediction information may include configuration information indicating whether to apply the beam prediction information to each channel.

The configuration information indicating whether to apply the beam prediction information to each channel may include configuration information indicating that the beam prediction information is used for a data channel and configuration information indicating that the beam prediction information is not used for a control channel.

The beam prediction information may include an identifier of each of the predicted beams, the valid time information may include a valid time for each of the predicted beams, and the beam prediction information and the valid time information may be independently encoded in different fields or jointly encoded in a same field.

The method may further comprise: sharing, with the base station, reference time information on a reference time, wherein the valid time information may include at least one of a start offset, an end offset, a specific offset, or a valid time period with respect to the reference time.

The valid time information may be received through a higher layer signal or a dynamic control signal of the base station.

The method may further comprise: sharing, with the base station, periodical beam update time points, wherein the valid time information may include configuration information indicating an earliest beam update time point after a time point obtained by adding a waiting time to a time point of receiving the beam prediction information or configuration information indicating an earliest beam update period after the time point obtained by adding the waiting time to the time point of receiving the beam prediction information.

The method may further comprise: receiving information of a prediction target time for channel state information from the base station; predicting the channel state information for the prediction target time; and transmitting the predicted channel state information to the base station.

The method may further comprise: receiving information of a predicted time of beam failure from the base station; transitioning to a sleep state after receiving the information of the predicted time; transitioning an operation state of the terminal from the sleep state to a wake-up state based on the predicted time; and monitoring a downlink control signal in the wake-up state.

The information of the predicted time may include configuration information instructing to wake up at a specific future time point relative to a reference time or configuration instructing to wake up in one or more discontinuous reception (DRX) on-durations in future relative to the reference time.

According to a second exemplary embodiment of the present disclosure, a method of a terminal may comprise: receiving downlink reference signals from a base station; generating beam report information based on the downlink reference signals, and transmitting the beam report information to the base station; receiving information on a beam prediction target time from the base station; performing beam prediction for the beam prediction target time; and transmitting beam prediction information according to the beam prediction to the base station.

The method may further comprise: sharing, with the base station, reference time information on a reference time, wherein the information on the beam prediction target time may include at least one of a start offset, a valid time period, an end offset, or a specific offset with respect to the reference time.

The method may further comprise: sharing, with the base station, periodical beam update time points, wherein the information on the beam prediction target time may include configuration information indicating an earliest beam update time point after a time point obtained by adding a waiting time to a time point of receiving a beam prediction report trigger signal, or configuration information on an earliest beam update period after the time point obtained by adding the waiting time to the time point of receiving the beam prediction report trigger signal.

The method may further comprise: receiving information on a prediction target time for channel state information from the base station; predicting the channel state information for the predicted target time; and transmitting the predicted channel state information to the base station.

The method may further comprise: predicting a layer 1 (L1) reference signal received power (RSRP) for a serving beam of the base station; predicting a beam failure based on the predicted L1 RSRP; transmitting information on a predicted time for the predicted beam failure to the base station; and monitoring a downlink control signal based on the predicted time.

According to a third exemplary embodiment of the present disclosure, a method of a base station may comprise: transmitting downlink reference signals to a terminal; receiving, from the terminal, beam report information based on the downlink reference signals;

performing beam prediction based on the beam report information; and transmitting, to the terminal, information on the beam prediction and valid time information of a valid time for the beam prediction.

The method may further comprise: transmitting information on a prediction target time for channel state information to the terminal; and receiving the channel state information predicted for the prediction target time from the terminal.

The method may further comprise: predicting a layer 1 (L1) reference signal received power (RSRP) for a serving beam of the base station; predicting a beam failure based on the predicted L1 RSRP; transmitting information on a predicted time for the predicted beam failure to the terminal; and transmitting a downlink control signal to the terminal based on the predicted time.

According to the present disclosure, a base station (or terminal) may generate beam prediction information for a future time point using a technique such as AI/ML, and transmit it to a terminal (or base station) along with valid time information. Then, the terminal (or base station) may configure a transmit beam and/or a receive beam at a time of data transmission/reception based on the beam prediction information and the valid time information. In this manner, if the base station or terminal configures the transmit beam and/or the receive beam by applying the beam prediction information in consideration of the valid time information, an occurrence of inconsistency in configuring the transmit beam and/or the receive beam between the base station and the terminal can be prevented.

BRIEF DESCRIPTION OF DRAWINGS

FIG. 15 is a conceptual diagram illustrating a first exemplary embodiment of a method of encoding beam prediction information and valid time information.

FIG. 16 is a conceptual diagram illustrating a second exemplary embodiment of a method of encoding beam prediction information and valid time information.

FIG. 17 is a conceptual diagram illustrating a third exemplary embodiment of a method of encoding beam prediction information and valid time information.

DETAILED DESCRIPTION OF THE EMBODIMENTS

Figure 1:
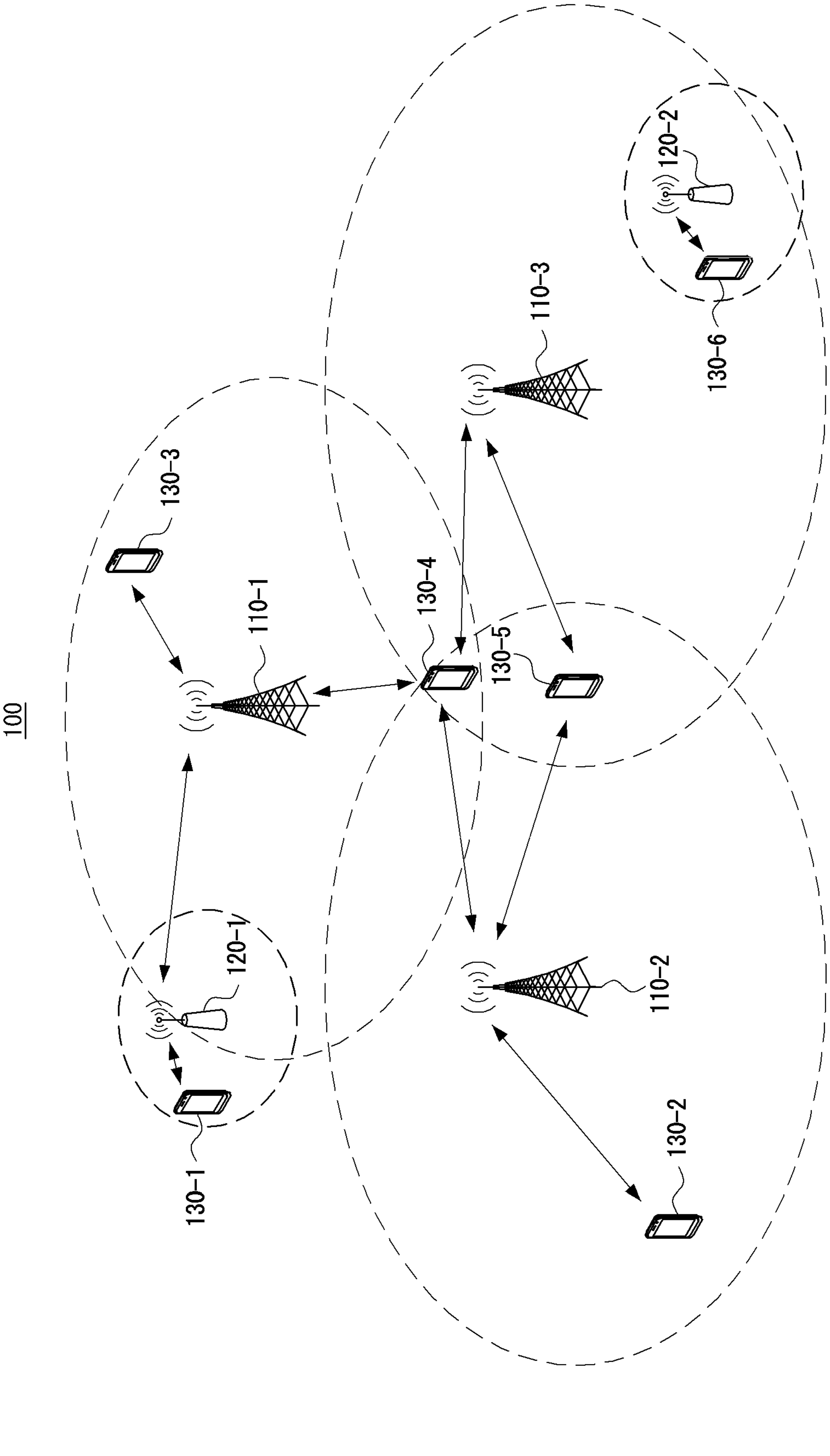
FIG. 1 is a conceptual diagram illustrating a first exemplary embodiment of a communication system.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system may be referred to as a 'communication network'. Each of the plurality of communication nodes may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single-carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
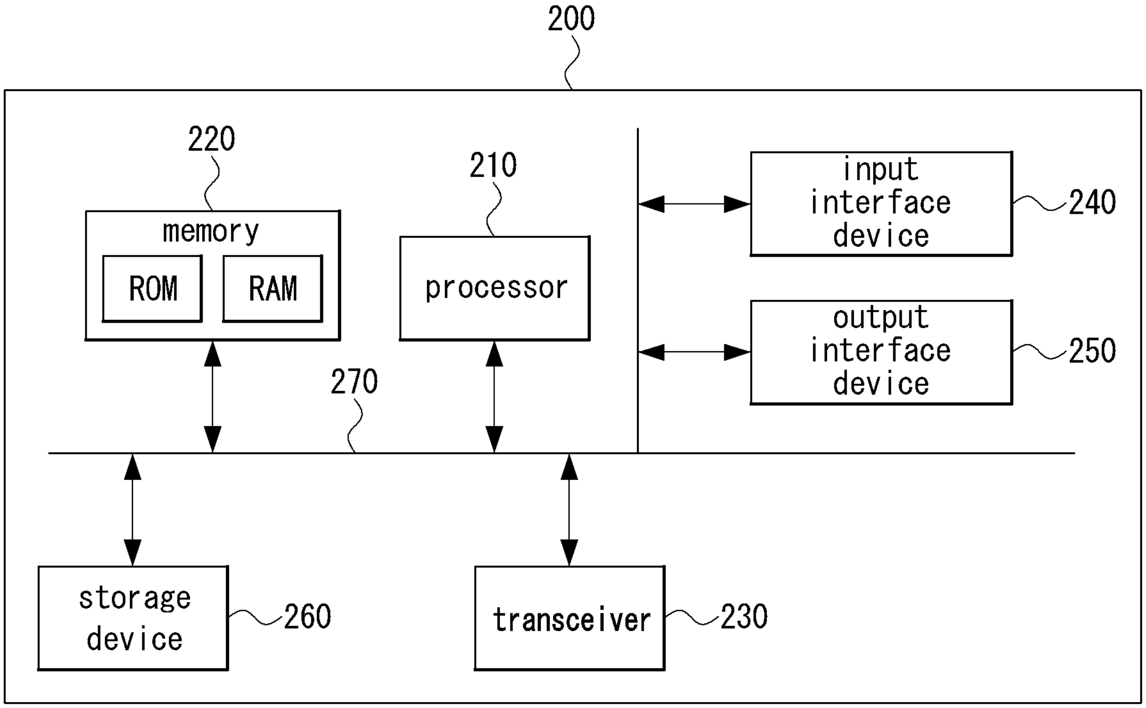
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270. However, the respective components included in the communication node 200 may be connected not to the common bus 270 but to the processor 210 through an individual interface or an individual bus. For example, the processor 210 may be connected to at least one of the memory 220, the transceiver 230, the input interface device 240, the output interface device 250, and the storage device 260 through dedicated interfaces.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1.

Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), relay node, or the like. Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Each of the plurality of communication nodes 110-1, 110-2, 110-3, 120-1, 120-2, 130-1, 130-2, 130-3, 130-4, 130-5, and 130-6 may support cellular communication (e.g., LTE, LTE-Advanced (LTE-A), New radio (NR), etc.). Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support OFDMA-based downlink (DL) transmission, and SC-FDMA-based uplink (UL) transmission. In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2).

Meanwhile, a mobile communication system has introduced a communication technology of a millimeter wave (mmWave) band (e.g., 30 GHz to 300 GHz) in order to support a rapidly increasing mobile communication data traffic demand. A path attenuation may be very severe in the millimeter wave band. In this regard, the mobile communication system can overcome such path attenuation by securing a high beam gain with a directional beamforming technology based on massive multiple input multiple output (MIMO). However, directional beamforming based on massive MIMO technology may have a very narrow beam width while having a high beam gain. Therefore, a beam management technique may be very important to configure appropriate transmit and/or receive beams for reliable link performance in the mmWave band.

In the 5G NR mobile communication standards led by the $3^{rd}$ generation partnership project (3GPP), an international standardization organization, a base station may transmit downlink reference signals such as a plurality of synchronization signal blocks (SSBs) and/or channel state information reference signals (CSI-RS) corresponding to a plurality of transmit beams to a terminal. Then, the terminal may receive a plurality of downlink reference signals from the base station, and measure link qualities such as reference signal received powers (RSRPs) for the received plurality of downlink reference signals.

The terminal may report an optimal transmit beam to the base station based on the link qualities measured for the plurality of downlink reference signals. Specifically, the terminal may perform beam management through steps such as beam sweeping, beam measurement, beam determination, and beam reporting.

Meanwhile, researches on applying artificial intelligence (AI) and machine learning (ML) technologies to mobile communication are actively underway. A method of predicting an optimal beam in a millimeter band based on AI/ML is being studied in relation to a millimeter wave band mobile communication technology. The detailed research topics of AWL-based beam prediction technology may be largely classified into three categories. The first is a beam prediction technique in the spatial domain. After performing beam measurements on some of the entire beams, measurement value(s) for the entire beams may be predicted using measurement value(s) for some of the entire beams. The second is a beam prediction technique in the time domain, which may refer to a technique of predicting an optimal beam in the future based on current and/or past beam measurement value(s). The third is a beam prediction technique using information of a low frequency band. For example, in a non-stand-alone (NSA) environment, an optimal beam in a millimeter wave band of 6 GHz or above may be predicted using channel state information acquired in a frequency band of 6 GHz or below. The 3GPP is discussing in release 18 how to combine the AI/ML technology with the NR radio transmission technology. In addition, the 3GPP is discussing the first and second topics, that is, the beam prediction technique in the spatial domain and the beam prediction technique in the time domain, as main subjects of the AWL-based beam management technology.

Recently, academia and/or standardization organizations are mainly discussing a deep learning model for increasing beam prediction accuracy and/or assistant information for improving an inference result of the deep learning model. For example, the base station may receive measurement information such as RSRPs from the terminal, and perform beam prediction in the time domain by using a deep learning model based on the measurement information. In addition, the base station may predict optimal beams for one or more future time points based on measurement information reported previously and/or currently by using a deep learning technique for regression among AI/ML techniques. Further, the base station may utilize the additional assistance information to improve the deep learning model. Here, the additional assistance information may be measurement information (e.g., beam identifier, beam angle, etc.) other than the RSRP.

However, the above-described technologies may not be clear about a time point at which the base station and the terminal apply beam information predicted based on AI/ML. Therefore, the present disclosure may propose a method for applying a beam predicted based on AI/ML as a transmit beam and/or a receive beam in the base station and/or the terminal.

In the present disclosure, the base station (or terminal) may generate beam prediction information for a future time point using a technique such as AI/ML, and transmit it to the terminal (or base station) along with valid time information. Then, the terminal (or the base station) may configure a transmit beam and/or a receive beam at a time of data transmission/reception based on the beam prediction information and the valid time information. If the base station or the terminal configures a transmit beam and/or a receive beam by applying the beam prediction information in consideration of the valid time information as described above, an inconsistency in configuring the transmit beam and/or receive beam between the base station and the terminal may be prevented.

For the convenience of the description below, a proposed method and apparatus of the present disclosure will be mainly described in terms of a wireless mobile communication system composed of a base station and a terminal. However, the proposed method and apparatus of the present disclosure may be extended and applied to any wireless mobile communication system composed of a transmitter and a receiver. In addition, hereinafter, the present disclosure will be described in terms of beam prediction and beam management. However, in the 3GPP 5G NR standard, beam information may be defined as part of channel state information (CSI), so the proposed methods of the present disclosure may be extended as applied to a case when conventional CSI (e.g., channel quality indicator (CQI), precoding matrix indicator (PMI), etc.) is predicted for a future time point. That is, the proposed methods of the present disclosure may be extended and applied by generalizing a beam to CSI within a non-conflicting range.

Meanwhile, in the present disclosure, the base station (or terminal) may perform beam prediction for a future time point. In this case, the base station (or terminal) may transmit valid time information of the beam prediction information to the terminal (or base station). In this case, the base station (or terminal) may transmit a plurality of pieces of beam prediction information and a plurality of pieces of valid time information corresponding to the plurality of pieces of beam prediction information to the terminal (or base station).

Figure 3:
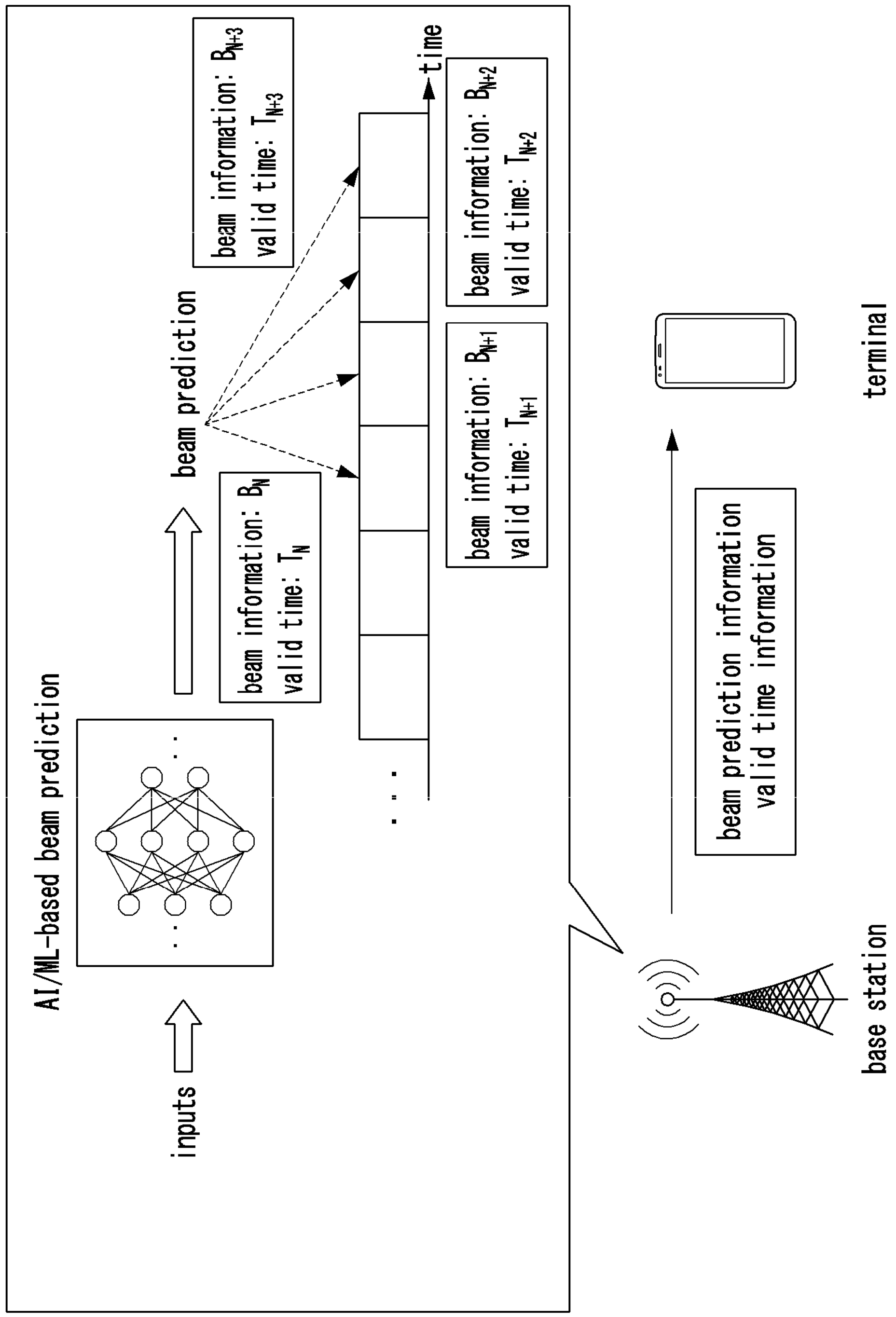
FIG. 3 is a conceptual diagram illustrating a first exemplary embodiment of a beam management method in a communication system.

FIG. 3 is a conceptual diagram illustrating a first exemplary embodiment of a beam management method in a communication system.

Referring to FIG. 3, the base station and the terminal may configure the 5G NR communication system according to the 3GPP standards. It may be assumed that base station and terminal constituting the 5G NR communication system operate in a frequency region 2 (FR2), which is a millimeter wave band. In this case, the base station may transmit a plurality of downlink reference signals (e.g., SSBs and CSI-RSs) corresponding to a plurality of beams to the terminal in a beam sweeping manner. Then, the terminal may measure and evaluate the plurality of beams using the downlink reference signals, select optimal beam(s), and report the selected optimal beam(s) to the base station. In this case, the terminal may report measurement and evaluation results of the plurality of beams to the base station together. Here, the beam may be a transmit beam transmitted by the base station.

The base station may receive the measurement and evaluation results for the plurality of beams from the terminal, and may receive information on the optimal beam(s) from the terminal. Accordingly, when an AI/ML technique can be used, the base station may predict an optimal beam for a future time point by applying the AI/ML technique such as deep learning based on the beam measurement results, beam evaluation results, and information on the optimal beam(s) received from the terminal. In addition, the base station may generate optimal beam prediction information for the optimal beam predicted for the future time point.

The optimal beam prediction information for the future time point may be usefully utilized by the terminal. Accordingly, the base station may transmit the optimal beam prediction information to the terminal, and the terminal may receive the optimal beam prediction information from the base station. For example, the terminal may prepare a spatial filter corresponding to the optimal beam to be transmitted by the base station at the future time point based on the optimal beam prediction information for the future time point. In addition, when transmitting data based on the optimal beam prediction information for the future time point, the terminal may apply a transmit beam corresponding to the predicted optimal beam.

However, the optimal beam prediction information cannot be optimal for all times and may be optimal until a certain time. Accordingly, the base station may predict a valid time point or valid time that can be optimal for the optimal beam prediction information. Here, the valid time may be a certain time period. In this manner, the base station may also transmit information on the valid time point or valid time predicted for the optimal beam prediction information to the terminal. Alternatively, the base station may also transmit information on a valid time period predicted for the optimal beam prediction information to the terminal. Accordingly, when the base station transmits the optimal beam prediction information to the terminal, the base station may inform the terminal of the information on the valid time point or valid time for the optimal beam prediction information. Alternatively, when the base station transmits the optimal beam prediction information to the terminal, the base station may also inform the terminal of information on the valid time period for the corresponding optimal beam prediction information. For example, the base station may inform the terminal of $B_N$ as the optimal beam prediction information, $T_N$ as the valid time information, $B_{N+1}$ as the optimal beam prediction information, $T_{N+1}$ as the valid time information, $B_{N+2}$ as the optimal beam prediction information, and $T_{N+2}$ as the valid time information. Here, N may be a positive integer. As described above, the base station may perform optimal beam prediction using a technique such as AI/ML, and transmit the beam prediction information and the valid time information for the beam prediction information to the terminal. Alternatively, the base station may perform optimal beam prediction using a technique such as AI/ML, and transmit the beam prediction information and the valid time period information for the beam prediction information to the terminal.

Then, the terminal may receive the optimal beam prediction information and the valid time point information from the base station. Alternatively, the terminal may receive the optimal beam prediction information and the valid time period information from the base station. Alternatively, the terminal may receive the optimal beam prediction information and the valid time period information from the base station. For example, the terminal may prepare a spatial filter corresponding to the optimal beam to be transmitted by the base station at the valid time based on the optimal beam prediction information. Alternatively, the terminal may prepare a spatial filter corresponding to the optimal beam to be transmitted by the base station in the valid time period based on the optimal beam prediction information for the valid time period. In addition, when transmitting data based on the optimal beam prediction information for the valid time, the terminal may apply a transmit beam corresponding to the predicted optimal beam. Alternatively, the terminal may apply a transmit beam corresponding to the predicted optimal beam when transmitting data based on the optimal beam prediction information for the valid time period. Meanwhile, the terminal may perform beam prediction based on the beam measurement result, beam evaluation result, and information on the optimal beam(s) using a technique such as AI/ML. In addition, the terminal may transmit the beam prediction information and the valid time information for the beam prediction information to the base station.

Meanwhile, when the base station (or terminal) can perform (optimal) beam prediction for a future time point, it may deliver the valid time information to the terminal (or base station) by one or more of the following schemes.

(1) Explicit Delivery Scheme
- A. A scheme of indicating a time point relative to a (specific) reference time point (2) Implicit Delivery Scheme
- A. A scheme of allowing valid time information to be derived based on a (specific) reference time point according to a pre-promised/pre-configured manner Here, the terminal (or base station) may determine the (specific) reference time point for interpreting a relative time point as an absolute time point by one or more of the following schemes.

- (1) A time point at which the base station (or terminal) transmits the beam prediction information to the terminal (or base station)
- (2) A time point at which the terminal (or base station) receives a control signal (e.g., PDCCH) that precedes to receive the beam prediction information from the base station (or terminal)
- (3) A time point at which a control signal (e.g., PDCCH) is transmitted as a feedback in response to the beam prediction information received from the base station (or terminal)

Figure 4:
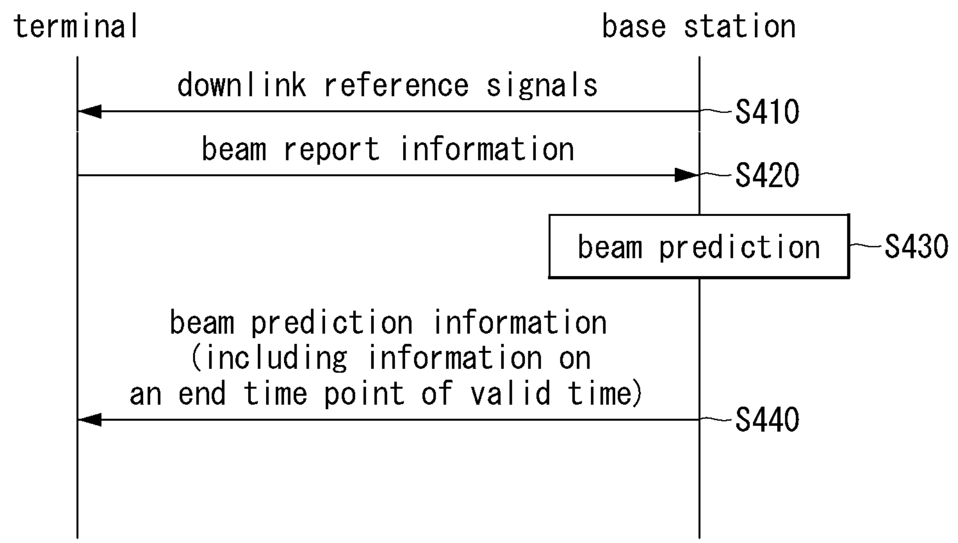
FIG. 4 is a conceptual diagram illustrating a second exemplary embodiment of a beam management method in a communication system.

FIG. 4 is a conceptual diagram illustrating a second exemplary embodiment of a beam management method in a communication system.

Referring to FIG. 4, the base station and the terminal may configure the 5G NR communication system according to the 3GPP standards. It may be assumed that base station and terminal constituting the 5G NR communication system operate in an FR2, which is a millimeter wave band. In this case, the base station may transmit a plurality of downlink reference signals (e.g., SSBs and CSI-RSs) corresponding to a plurality of beams to the terminal in a beam sweeping manner (S410). Then, the terminal may measure and evaluate the plurality of beams using the downlink reference signals, select optimal beam(s), and transmit beam report information including information on the selected optimal beam(s) to the base station. In this case, the terminal may report measurement and evaluation results of the plurality of beams to the base station by including them in the beam report information (S420).

The base station may receive the beam report information including measurement and evaluation results of the plurality of beams and information on the optimal beam(s) from the terminal. Accordingly, when an AI/ML technique can be used, the base station may predict an optimal beam for a future time point by applying the AI/ML technique such as deep learning based on the beam measurement result, beam evaluation result, and beam report information on the optimal beam(s) received from the terminal (S430). In addition, the base station may generate optimal beam prediction information for the optimal beam predicted for the future time point.

The optimal beam prediction information for the future time point may be usefully utilized by the terminal. Accordingly, the base station may transmit the optimal beam prediction information to the terminal (S440). The terminal may receive the optimal beam prediction information from the base station. For example, the terminal may prepare a spatial filter corresponding to the optimal beam to be transmitted from the base station at the future time point based on the optimal beam prediction information for the future time point. In addition, when transmitting data based on the optimal beam prediction information for the future time point, the terminal may apply a transmit beam corresponding to the predicted optimal beam.

However, the optimal beam prediction information cannot be optimal for all times and may be optimal until a certain time. Accordingly, the base station may predict a valid time that can be optimal for the optimal beam prediction information. The base station may also deliver information on the valid time predicted for the optimal beam prediction information to the terminal. Therefore, when the base station transmits the optimal beam prediction information to the terminal, the base station may also inform the valid time information for the corresponding optimal beam prediction information.

In this case, as a scheme of transmitting the valid time information, there may be an explicit delivery scheme and an implicit delivery scheme. Here, the explicit delivery scheme may be a scheme in which the base station informs the terminal of valid time period information directly indicating a relative end time point at which the valid time ends with respect to a specific reference time point. For example, the base station may transmit reference time point configuration information to the terminal so that the terminal sets a time point at which the beam prediction information is transmitted as the reference time point. Then, the terminal may receive the reference time point configuration information from the base station, and may set the time point at which the base station transmits the beam prediction information as the reference time point.

Thereafter, the base station may transmit information on an end time point of the valid time, such as an offset for a time point at which the beam prediction information is valid relative to the reference time point, to the terminal. In this case, the base station may transmit information on the end time point of the valid time to the terminal together with the beam prediction information. Then, the terminal may derive the valid time of the beam prediction information received from the base station by applying the information on the end time point of the valid time based on the set reference time point.

On the other hand, the implicit delivery scheme may be a scheme that allows the terminal to derive the valid time of the beam prediction information in a pre-promised or pre-configured manner based on the specific reference time point. For example, the base station may transmit reference time point configuration information to the terminal so that the terminal sets a time point at which the beam prediction information is received as a reference time point. Then, the terminal may receive the reference time point configuration information from the base station, and may set the time point at which the beam prediction information is received from the base station as the reference time point. In addition, the base station may define beam selection time points having a periodicity shorter than an actual beam reporting interval, and the base station may inform the terminal of information on the newly defined beam selection time points. Then, the terminal may receive information on the newly defined beam selection time points from the base station.

Thereafter, the base station may transmit the beam prediction information to the terminal. The terminal may receive the beam prediction information from the base station. Accordingly, the terminal may use a time point at which the beam prediction information is received as a reference time point, and derive a time until a beam selection time point that arrives the earliest thereafter as the valid time of the received beam prediction information.

The terminal may prepare a spatial filter corresponding to the optimal beam to be transmitted from the base station in the valid time based on the derived optimal beam prediction information for the valid time. In addition, when transmitting data based on the optimal beam prediction information for the valid time, the terminal may apply a transmit beam corresponding to the predicted optimal beam.

Here, the base station may perform beam prediction using a technique such as AI/ML, and transmit beam prediction information and valid time information for the beam prediction information to the terminal. However, the proposed method of the present disclosure may be obviously applied even in the case of an operation in which the terminal performs beam prediction using a technique such as AI/ML and transmits beam prediction information and valid time information for the beam prediction information to the base station. Alternatively, the terminal may perform beam prediction based on the beam measurement result, beam evaluation result, and information on optimal beam(s) by using a technique such as AI/ML. In addition, the terminal may transmit beam prediction information and valid time information for the beam prediction information to the base station.

Meanwhile, the base station may transmit information on a time (or time period) to be targeted for beam prediction (hereinafter, 'beam prediction target time') to the terminal. In this case, the base station may transmit information on a plurality of beam prediction target times (or time periods) to be targeted for beam prediction to the terminal. Accordingly, the terminal may receive information on the beam prediction target time from the base station. In addition, the terminal may perform optimal beam prediction for the beam prediction target time using an AI model.

Figure 5:
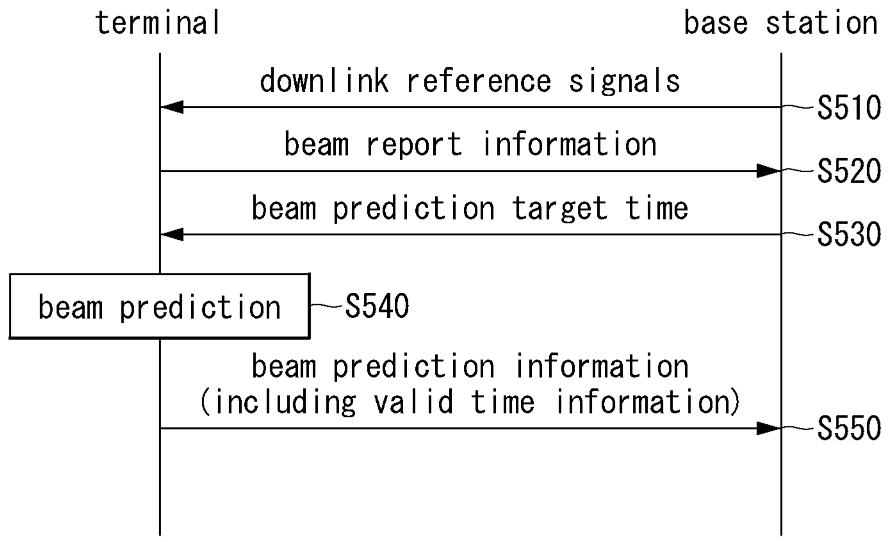
FIG. 5 is a conceptual diagram illustrating a third exemplary embodiment of a beam management method in a communication system.

FIG. 5 is a conceptual diagram illustrating a third exemplary embodiment of a beam management method in a communication system.

Referring to FIG. 5, the base station and the terminal may configure the 5G NR communication system according to the 3GPP standards. It may be assumed that base station and terminal constituting the 5G NR communication system operate in an FR2, which is a millimeter wave band. In this case, the base station may transmit a plurality of downlink reference signals (e.g., SSBs and CSI-RSs) corresponding to a plurality of beams to the terminal in a beam sweeping manner (S510). Then, the terminal may measure and evaluate the plurality of beams using the downlink reference signals, select optimal beam(s), and transmit beam report information including information on the optimal beam(s) to the base station (S520). In this case, the terminal may report measurement and evaluation results of the plurality of beams to the base station together with the beam report information.

In this case, when the terminal can apply an AI/ML technique, the terminal may perform optimal beam prediction for a future time point by utilizing various channel measurement information based on the downlink reference signals. When the terminal predicts an optimal beam for a future time point as described above, it may be expected to obtain high accuracy for beam prediction when compared to the base station because available channel information is relatively abundant in the terminal. However, since it is difficult for the terminal to predict a next scheduling time point, unlike the base station that directly controls scheduling, it may be difficult to determine a necessary time point for beam prediction.

Accordingly, the base station may transmit information on a time (or time period) to be targeted for beam prediction (hereinafter, 'beam prediction target time') to the terminal (S530). In this case, the base station may transmit information on a plurality of beam prediction target times (or time periods) to be targeted for beam prediction to the terminal. The terminal may receive information on the beam prediction target time or information on the plurality of beam prediction target times from the base station. In addition, the terminal may use an AI model to perform optimal beam prediction based on the beam measurement result, beam evaluation result, and information on the optimal beam(s) for the beam prediction target time or the plurality of beam prediction target times (S540).

Thereafter, the terminal may transmit optimal beam prediction information for the beam prediction target time to the base station (S550). In this case, when the terminal transmits the optimal beam prediction information for the plurality of beam prediction target times to the base station, the terminal may also transmit information on valid times to the base station. Here, the valid times may correspond to the beam prediction target times. For example, the terminal may inform the base station of $B_M$ as the optimal beam prediction information, $T_M$ as the valid time information, $B_{M+1}$ as the optimal beam prediction information, $T_{M+1}$ as the valid time information, $B_{M+2}$ as optimal beam prediction information, $T_{M+2}$ as the valid time information. Then, the base station may receive the optimal beam prediction information and valid time information from the terminal. For example, the base station may perform scheduling on the optimal beam to be transmitted to the terminal at the valid time based on the optimal beam prediction information for the valid time.

Meanwhile, when the base station indicates to the terminal information on the time (or time period) to be targeted for beam prediction ('beam prediction target time information'), the terminal may transmit information on the beam prediction target time to the terminal by one or more of the following schemes.

(1) Explicit Delivery Scheme

A. A scheme of indicating a time point relative to a (specific) reference time point (2) Implicit Delivery Scheme A. A scheme of deriving beam prediction target time information based on a (specific) reference tune point in a pre-promised/pre-configured manner Here, the (specific) reference time point for interpreting a relative time point as an absolute time point may be determined by one or more of the following schemes.

Figure 6:
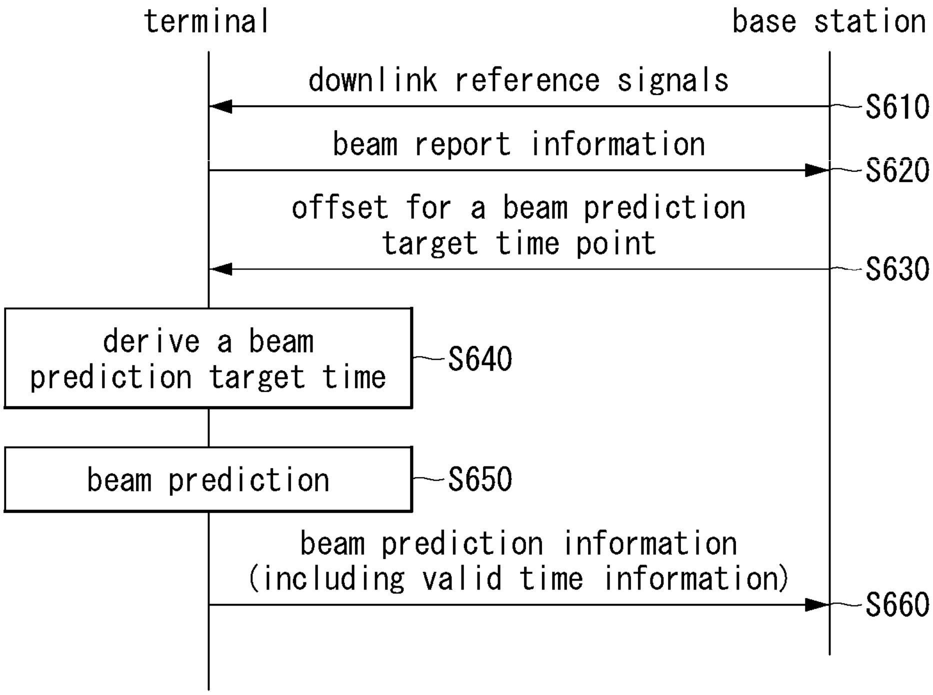
FIG. 6 is a conceptual diagram illustrating a fourth exemplary embodiment of a beam management method in a communication system.

(1) A time point at which the base station triggers a beam prediction report to the terminal (2) A time point at which the terminal reports beam prediction information to the base station (3) A time point at which the terminal receives a control signal (e.g., PDCCH) preceding for the terminal to report beam prediction information to the base station (4) A time point at which a control signal (e.g., PDCCH) is received as a feedback by the base station in response to the beam prediction information reported from the terminal FIG. 6 is a conceptual diagram illustrating a fourth exemplary embodiment of a beam management method in a communication system.

Referring to FIG. 6, the base station and the terminal may configure the 5G NR communication system according to the 3GPP standards. It may be assumed that base station and terminal constituting the 5G NR communication system operate in an FR2, which is a millimeter wave band. In this case, the base station may transmit a plurality of downlink reference signals (e.g., SSBs and CSI-RSs) corresponding to a plurality of beams to the terminal in a beam sweeping manner (S610). Then, the terminal may measure and evaluate the plurality of beams using the downlink reference signals, select optimal beam(s), and transmit beam report information including information on the selected optimal beam(s) to the base station (S620). In this case, the terminal may report measurement and evaluation results of the plurality of beams to the base station together with the beam report information.

In this case, when the terminal can apply an AI/ML technique, the terminal may perform optimal beam prediction for a future time point by utilizing various channel measurement information based on the downlink reference signals. Accordingly, the base station may transmit information on a time (or time period) to be targeted for beam prediction (hereinafter, 'beam prediction target time') to the terminal.

In this case, as a scheme of delivering the beam prediction target time (period), there may be an explicit delivery scheme and an implicit delivery scheme. Here, the explicit delivery scheme may be a scheme in which the base station informs the terminal of beam prediction target period information directly indicating a relative end time point at which the beam prediction target time ends with respect to a specific reference time point. For example, the base station may transmit reference time point configuration information to the terminal so that the terminal sets a time point at which the beam prediction report is triggered to the terminal as the reference time point. Then, the terminal may receive the reference time point configuration information from the base station, and may set the time point at which the base station triggers the beam prediction report as the reference time point.

Thereafter, the base station may signal beam prediction target time information such as an offset of the beam prediction target time relative to the reference time point to the terminal (S630). The terminal may derive the beam prediction target time by applying the beam prediction target time information based on the set reference time point (S640).

On the other hand, the implicit delivery scheme may be a scheme that allows the terminal to derive the beam prediction target time in a pre-promised or pre-configured manner based on the specific reference time point. For example, the base station may transmit reference time point configuration information to the terminal so that the terminal sets a time point at which the beam prediction information report is triggered as a reference time point. Then, the terminal may receive the reference time point configuration information from the base station, and may set the time point at which the beam prediction information report is triggered by the base station as the reference time point. In addition, the base station may define beam selection time points having a periodicity shorter than an actual beam reporting interval, and the base station may inform the terminal of information on the newly defined beam selection time points. Then, the terminal may receive information on the newly defined beam selection time points from the base station. Accordingly, the terminal may take the time point at which the beam prediction information report is triggered as the reference time point, and then derive a time until a beam selection time point that arrivers the earliest thereafter as the beam prediction target time.

In addition, the terminal may perform optimal beam prediction based on the beam measurement result, beam evaluation result, and information on the optimal beam(s) for the beam prediction target time using an AI model that performs optimal beam prediction (S650). Thereafter, the terminal may transmit optimal beam prediction information for the beam prediction target time to the base station (S660). In this case, when the terminal transmits the optimal beam prediction information for the beam prediction target time to the base station, the terminal may also transmit information on a valid time to the terminal. Here, the valid time may correspond to the beam prediction target time. Then, the base station may receive the optimal beam prediction information and valid time information from the terminal. For example, the base station may perform scheduling on the optimal beam to be transmitted to the terminal at the valid time based on the optimal beam prediction information for the valid time.

Meanwhile, the base station may transmit information on a time (or time period) to be targeted for CSI prediction (hereinafter referred to as 'CSI prediction target time') to the terminal. In this case, the base station may transmit information on a plurality of CSI prediction target times (or time periods) to be targeted for CSI prediction to the terminal. Accordingly, the terminal may receive information on the CSI prediction target time(s) (period(s)) from the base station, and may perform optimal CSI prediction at the CSI prediction target time using an AI model that performs optimal CSI prediction.

Figure 7:
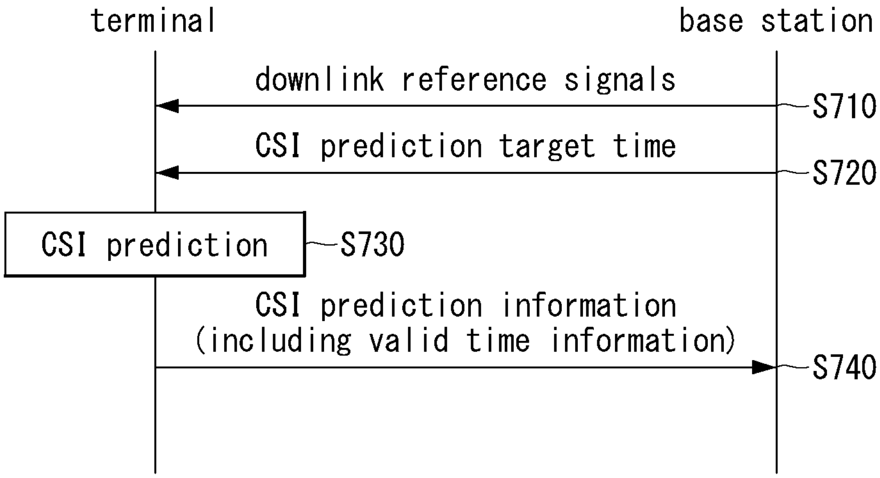
FIG. 7 is a conceptual diagram illustrating a fifth exemplary embodiment of a beam management method in a communication system.

FIG. 7 is a conceptual diagram illustrating a fifth exemplary embodiment of a beam management method in a communication system.

Referring to FIG. 7, the base station and the terminal may configure the 5G NR communication system according to the 3GPP standards. It may be assumed that base station and terminal constituting the 5G NR communication system operate in an FR2, which is a millimeter wave band. The terminal may report channel state information (CSI) to the base station for the purpose of supporting link adaptation according to a modulation and coding scheme (MCS) setting of the base station, multiple input multiple output (MIMO) technique, and the like.

In this case, the base station may transmit a plurality of downlink reference signals (e.g., SSBs and CSI-RSs) corresponding to a plurality of beams to the terminal in a beam sweeping manner (S710). Then, when an AI/ML technique can be applied, the terminal may perform optimal CSI prediction for a future time point by utilizing various channel measurement information based on the downlink reference signals. When the terminal predicts the optimal CSI for a future time point as described above, it may be expected to obtain high accuracy for CSI prediction when compared to the base station because available channel information is relatively abundant in the terminal. However, unlike the base station that directly controls scheduling, it is difficult for the terminal to predict a next scheduling time point, so it may be difficult to determine a necessary time point for CSI prediction.

Accordingly, the base station may transmit information on a time (or time period) to be targeted for CSI prediction (hereinafter, 'CSI prediction target time') to the terminal (S720). In this case, the base station may transmit information on a plurality of CSI prediction target times (or time periods) to be targeted for CSI prediction to the terminal. Accordingly, the terminal may receive information on the CSI prediction target time (period) or information on a plurality of CSI prediction target times (period(s)) from the base station. In addition, the terminal may perform optimal CSI prediction based on past and/or current beam channel information for the CSI prediction target time (period) or the plurality of CSI prediction target times (period(s)) using an AI model that performs optimal CSI prediction (S730).

Thereafter, the terminal may transmit optimal CSI prediction information for the CSI prediction target time to the base station (S740). In this case, when the terminal transmits optimal CSI prediction information for the plurality of CSI prediction target times to the base station, the terminal may also transmit information on a valid time to the base station. Here, the valid time may correspond to the CSI prediction target time. Then, the base station may receive the optimal CSI prediction information and valid time information from the terminal. For example, the base station may perform scheduling on an optimal beam to be transmitted to the terminal at the valid time based on the optimal CSI prediction information for the valid time.

Meanwhile, when the base station indicates to the terminal information on the time (or time period) ('CSI prediction target time information') to be targeted for CSI prediction, the terminal may transmit information on the CSI prediction target time to the terminal by one or more of the following schemes.

(1) Explicit Delivery Scheme
- A. A scheme of indicating a time point relative to a (specific) reference time point (2) Implicit Delivery Scheme
- A. A scheme of deriving CSI prediction target time information based on a (specific) reference tune point in a pre-promised/pre-configured manner Here, the (specific) reference time point for interpreting a relative time point as an absolute time point may be determined by one or more of the following schemes.

Figure 8:
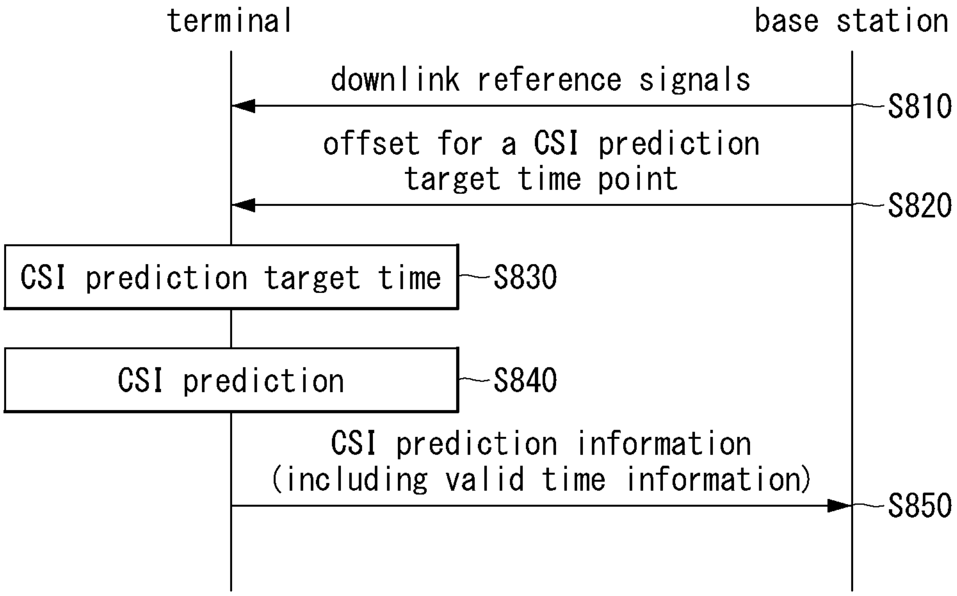
FIG. 8 is a conceptual diagram illustrating a sixth exemplary embodiment of a beam management method in a communication system.

(1) A time point at which the base station triggers a CSI prediction report to the terminal
(2) A time point at which the terminal reports CSI prediction information to the base station
(3) A time point at which the terminal receives a control signal (e.g., PDCCH) preceding for the terminal to report CSI prediction information to the base station
(4) A time point at which a control signal (e.g., PDCCH) is received as a feedback by the base station in response to the CSI prediction information reported from the terminal FIG. 8 is a conceptual diagram illustrating a sixth exemplary embodiment of a beam management method in a communication system.

Referring to FIG. 8, the base station and the terminal may configure the 5G NR communication system according to the 3GPP standards. It may be assumed that base station and terminal constituting the 5G NR communication system operate in an FR2, which is a millimeter wave band. The terminal may report CSI to the base station for the purpose of supporting link adaptation according to an MCS setting of the base station, MIMO technique, and the like.

In this case, the base station may transmit a plurality of downlink reference signals (e.g., SSBs and CSI-RSs) corresponding to a plurality of beams to the terminal in a beam sweeping manner (S810). Then, when an AI/ML technique can be applied, the terminal may perform optimal CSI prediction for a future time point by utilizing various channel measurement information based on the downlink reference signals.

Accordingly, the base station may transmit information on a time (or time period) to be targeted for CSI prediction (hereinafter, 'CSI prediction target time') to the terminal (S820). In this case, as a scheme of delivering the CSI prediction target time (period), there may be an explicit delivery scheme and an implicit delivery scheme. Here, the explicit delivery scheme may be a scheme in which the base station informs the terminal of CSI prediction target period information directly indicating a relative end time point at which the CSI prediction target time ends with respect to a specific reference time point. For example, the base station may transmit reference time point configuration information to the terminal so that the terminal sets a time point at which the CSI prediction information report is triggered to the terminal as the reference time point. Then, the terminal may receive the reference time point configuration information from the base station, and may set the time point at which the base station triggers the CSI prediction information report as the reference time point.

Thereafter, the base station may signal CSI prediction target time information such as an offset of the CSI prediction target time relative to the reference time point to the terminal. The terminal may derive the CSI prediction target time by applying the CSI prediction target time information based on the set reference time point (S830).

On the other hand, the implicit delivery scheme may be a scheme that allows the terminal to derive the CSI prediction target time in a pre-promised or pre-configured manner based on the specific reference time point. For example, the base station may transmit reference time point configuration information to the terminal so that the terminal sets a time point at which the CSI prediction information report is triggered as a reference time point. Then, the terminal may receive the reference time point configuration information from the base station, and may set the time point at which the CSI prediction information report is triggered by the base station as the reference time point. In addition, the base station may define CSI selection time points having a periodicity shorter than an actual beam reporting interval, and the base station may inform the terminal of information on the newly defined CSI selection time points. Then, the terminal may receive information on the newly defined CSI selection time points from the base station. Accordingly, the terminal may take the time point at which the CSI prediction information report is triggered as the reference time point, and then derive a time until a CSI selection time point that arrivers the earliest thereafter as the CSI prediction target time.

In addition, the terminal may perform optimal CSI prediction based on the channel information for the CSI prediction target time using an AI model that performs optimal CSI prediction (S840). Thereafter, the terminal may transmit optimal CSI prediction information for the CSI prediction target time to the base station (S850). In this case, when the terminal transmits the CSI beam prediction information for the CSI beam prediction time to the base station, the terminal may also transmit information on a valid time to the terminal. Here, the valid time may correspond to the CSI prediction target time. Then, the base station may receive the optimal CSI prediction information and valid time information from the terminal. For example, the base station may perform scheduling on the optimal beam to be transmitted to the terminal at the valid time based on the optimal CSI prediction information for the valid time.

Meanwhile, the base station (or terminal) may indicate the valid time information to the terminal (or base station) in one or more of the following schemes.

(1) A scheme of indicating a (specific) time point compared to a (specific) reference time point A. indicates an offset from a reference time point (2) A scheme of indicating a (specific) time period in the future compared to a (specific) reference time point A. indicates an offset from the reference time point and the length of a period B. indicates an offset of a start time point and an offset of an end time point relative to a reference time point Here, information on the offset, period length, start time point, and end time point may be indicated by one or more of the following schemes.

(1) pre-promising/pre-configuration (2) configuration through a higher layer signal (e.g., RRC signaling)

(3) configuration through a dynamic control signal (e.g., downlink control information (DCI), MAC control element (CE))

Figure 9A:
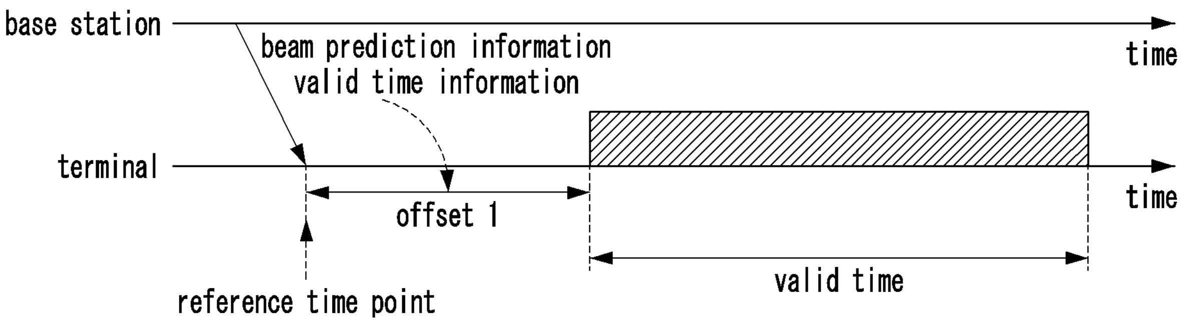
FIGS. 9A and 9B are conceptual diagrams illustrating a seventh exemplary embodiment of a beam management method in a communication system.
Figure 9B:
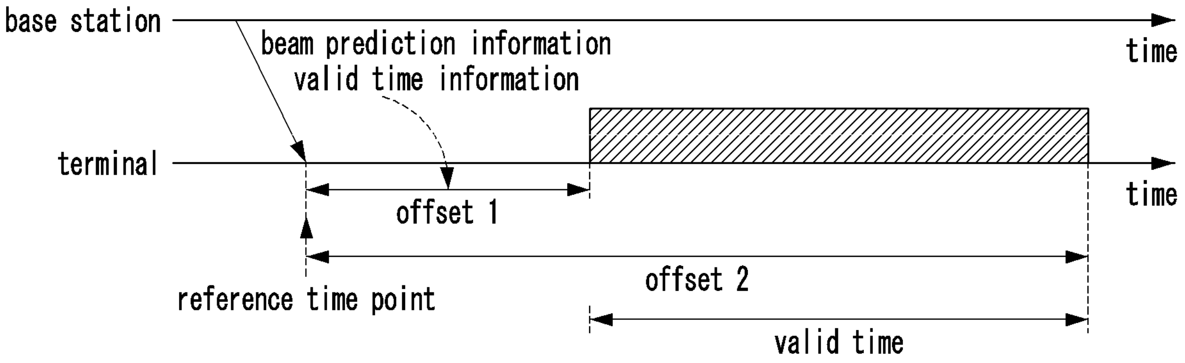

FIGS. 9A and 9B are conceptual diagrams illustrating a seventh exemplary embodiment of a beam management method in a communication system.

Referring to FIGS. 9A and 9B, the base station and the terminal may configure the 5G NR communication system according to the 3GPP standards. It may be assumed that base station and terminal constituting the 5G NR communication system operate in an FR2, which is a millimeter wave band. In this case, the base station may transmit a plurality of downlink reference signals (e.g., SSBs and CSI-RSs) corresponding to a plurality of beams to the terminal in a beam sweeping manner. Then, the terminal may measure and evaluate the plurality of beams using the downlink reference signals, select optimal beam(s), and report the selected optimal beam(s) to the base station. In this case, the terminal may report measurement and evaluation results of the plurality of beams to the base station together.

Then, the base station may receive the measurement and evaluation results for the plurality of beams from the terminal, and may receive information on the optimal beam(s) from the terminal. Accordingly, when an AI/ML technique can be used, the base station may apply the AI/ML technique such as deep learning based on the beam measurement results, beam evaluation results, and information on the optimal beam(s) received from the terminal to predict optimal beam(s) for a future time point. In addition, the base station may generate optimal beam prediction information for the optimal beam predicted for a future time point. In addition, the base station may predict a valid time optimal for the optimal beam prediction information. The base station may also transmit information on the valid time predicted for the optimal beam prediction information to the terminal.

In this case, an explicit delivery scheme may be used as a method of delivering the valid time information. Here, the explicit delivery scheme may be, for example, a scheme in which the base station informs the terminal of valid period information directly indicating a relative end time point at which a valid time ends with respect to a specific reference time point. For example, referring to FIG. 9A, the base station may transmit reference time point configuration information to the terminal so that the terminal sets a time point at which the beam prediction information is transmitted to the terminal as the reference time point. The terminal may receive the reference time point configuration information from the base station, and may set the time point at which the base station transmits the beam prediction information as the reference time point.

Thereafter, the base station may signal the end time point of valid time period information, such as an offset for a time point at which the beam prediction information is valid compared to the reference time point, to the terminal. The terminal may derive the valid time of the beam prediction information received from the base station by applying the end time point of valid time period information based on the set reference time point.

As another example, the explicit delivery scheme may indicate a specific time period in the future compared to the reference time point. In the case of indicating a specific time period in the future relative to the reference time point, for example, the base station may inform the terminal of an offset for a start time point relative to the reference time point and the length of the period. Then, the terminal may receive the information on the offset for the start time point and the length of the period from the base station. The terminal may set the time point obtained by applying the offset to the reference time point as the start time point of the valid time period, and may set the time point obtained by adding the period length to the start time point as the end time point of the valid time period.

When indicating a specific time period in the future relative to the reference time point, referring to FIG. 9B as another example, the base station may inform the terminal of an offset 1 for a start time point and an offset 2 for an end time point relative to the reference time point. Then, the terminal may receive information on the offset 1 for the start time point and the offset 2 for the end time point from the base station. In addition, the terminal may set a time point obtained by applying the offset 1 to the reference time point as a start time point of the valid time, and may set a time point obtained by adding the offset 2 to the start time point as an end time point of the valid time.

On the other hand, the terminal may receive the beam prediction information from the base station. In addition, the terminal may receive the valid time information from the base station through a higher layer signal or a dynamic control signal. Accordingly, the terminal may know the valid time information for the received beam prediction information. As a result, the terminal may prepare a spatial filter corresponding to an optimal beam to be transmitted from the base station at the valid time based on the optimal beam prediction information for the valid time. In addition, when transmitting data based on the optimal beam prediction information for the valid time, the terminal may apply a transmit beam corresponding to the predicted optimal beam.

Here, the base station may perform beam prediction using a technique such as AI/ML, and transmit beam prediction information and valid time information of the beam prediction information to the terminal. However, the proposed method of the present disclosure may be obviously applied even in the case of an operation in which the terminal performs beam prediction using a technique such as AI/ML and transmits beam prediction information and valid time information of the beam prediction information to the base station. Alternatively, the terminal may perform beam prediction based on a beam measurement result, beam evaluation result, and information on optimal beam(s) by using a technique such as AI/ML. In addition, the terminal may transmit beam prediction information and valid time information for the beam prediction information to the base station.

Meanwhile, the base station may indicate to the terminal information on a time (or time period) to be targeted for beam prediction ('beam prediction target time information'). In this case, the base station may explicitly deliver the beam prediction target time information to the terminal in one or more of the following schemes.

(1) A scheme of indicating a (specific) time point in the further compared to a (specific) reference time point A. indicates an offset from a reference time point (2) A scheme of indicating a (specific) time period in the future compared to a (specific) reference time point A. indicates an offset from the reference time point and the length of a period B. indicates an offset of a start time point and an offset of an end time point relative to a reference time point Here, information on the offset, period length, start time point, and end time point may be indicated by one or more of the following schemes.

(1) pre-promising/pre-configuration (2) configuration through a higher layer signal (e.g., RRC signaling)

(3) configuration through a dynamic control signal (e.g., downlink control information (DCI), MAC control element (CE))

Figure 10:
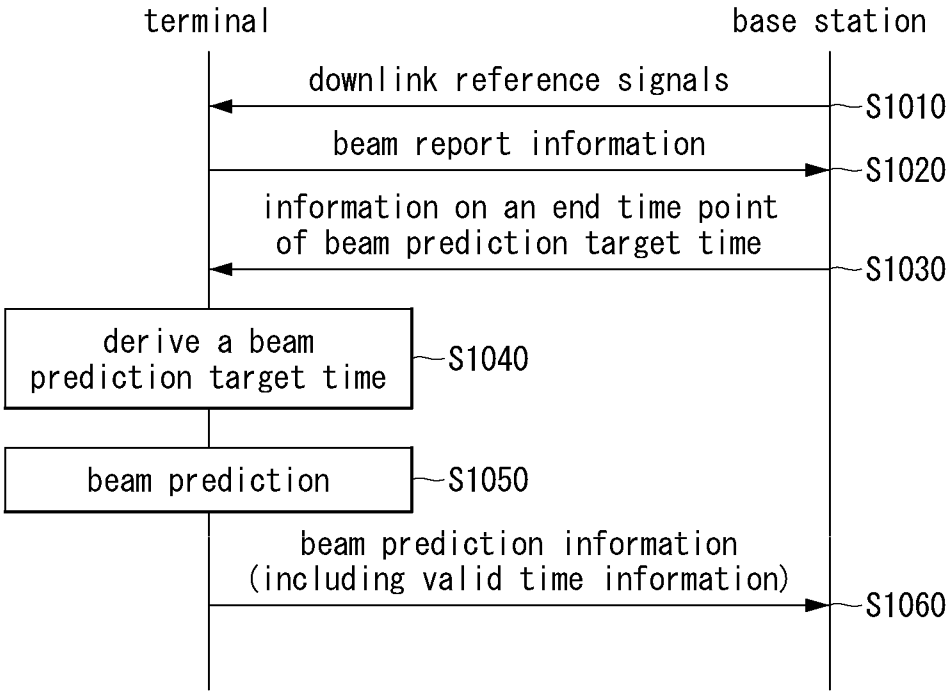
FIG. 10 is a conceptual diagram illustrating an eighth exemplary embodiment of a beam management method in a communication system.

FIG. 10 is a conceptual diagram illustrating an eighth exemplary embodiment of a beam management method in a communication system.

Referring to FIG. 10, the base station and the terminal may configure the 5G NR communication system according to the 3GPP standards. It may be assumed that base station and terminal constituting the 5G NR communication system operate in an FR2, which is a millimeter wave band. In this case, the base station may transmit a plurality of downlink reference signals (e.g., SSBs and CSI-RSs) corresponding to a plurality of beams to the terminal in a beam sweeping manner (S1010). Then, the terminal may measure and evaluate the plurality of beams using the downlink reference signals, select optimal beam(s), and report the selected optimal beam(s) to the base station. In this case, the terminal may report measurement and evaluation results of the plurality of beams to the base station together (S1020).

In this case, when the terminal can apply an AI/ML technique, the terminal may perform optimal beam prediction for a future time point by utilizing various channel measurement information based on the downlink reference signals. Accordingly, the base station may transmit information on a time (or time period) to be targeted for the beam prediction (i.e., beam prediction target time) to the terminal.

In this case, an explicit delivery scheme may be used as a method of delivering the beam prediction target time information. Here, the explicit delivery scheme may be, for example, a scheme in which the base station informs the terminal of beam prediction target time information directly indicating a relative end time point at which a beam prediction target time ends with respect to a specific reference time point. For example, the base station may transmit reference time point configuration information to the terminal so that the terminal sets a time point at which the beam prediction information report is triggered to the terminal as the reference time point. The terminal may receive the reference time point configuration information from the base station, and may set the time point at which the base station triggers the beam prediction information report as the reference time point.

Thereafter, the base station may signal beam prediction target time end time point information, such as an offset for a beam prediction target time point compared to the reference time point, to the terminal (S1030). The terminal may derive the beam prediction target time received from the base station by applying the beam prediction target time end time point information based on the set reference time point (S1040).

As another example, the explicit delivery scheme may indicate a specific time period in the future compared to the reference time point. In the case of indicating a specific time period in the future relative to the reference time point, for example, the base station may inform the terminal of an offset for a start time point relative to the reference time point and the length of the period. Then, the terminal may receive the information on the offset for the start time point and the length of the period from the base station. The terminal may set the time point at which the offset is applied from the reference time point as the start time point of the beam prediction target time, and may set the time point obtained by adding the period length to the start time point as the end time point of the beam prediction target time.

When indicating a specific time period in the future relative to the reference time point, as another example, the base station may inform the terminal of an offset for a start time point and an offset for an end time point relative to the reference time point. Then, the terminal may receive information on the offset for the start time point and the offset for the end time point from the base station. In addition, the terminal may set a time point at which one offset is applied from the reference time point as a start time point of the beam prediction target time, and may set a time point obtained by adding the other offset to the start time point as an end time point of the beam prediction target time.

Thereafter, the terminal may perform optimal beam prediction based on the beam measurement result, beam evaluation result, and information on optimal beam(s) for the beam prediction target time using an AI model that performs optimal beam prediction (S1050). Thereafter, the terminal may transmit optimal beam prediction information for the beam prediction target time to the base station (S1060). In this case, when the terminal transmits the optimal beam prediction information for the target beam prediction time to the base station, the terminal may also transmit information on a valid time to the terminal. Here, the valid time may correspond to the beam prediction target time. Then, the base station may receive the optimal beam prediction information and the valid time information from the terminal. For example, the base station may perform scheduling on the optimal beam to be transmitted to the terminal at the valid time based on the optimal beam prediction information for the valid time.

Meanwhile, the base station may indicate to the terminal information on a time (or time period) to be targeted for CSI prediction ('CSI prediction target time information'). In this case, the base station may explicitly deliver the CSI prediction target time information to the terminal in one or more of the following schemes.

(1) A scheme of indicating a (specific) time point in the further compared to a (specific) reference time point A. indicates an offset from a reference time point (2) A scheme of indicating a (specific) time period in the future compared to a (specific) reference time point A. indicates an offset from the reference time point and the length of a period B. indicates an offset of a start time point and an offset of an end time point relative to a reference time point Here, information on the offset, period length, start time point, and end time point may be indicated by one or more of the following schemes.

(1) pre-promising/pre-configuration (2) configuration through a higher layer signal (e.g., RRC signaling)

(3) configuration through a dynamic control signal (e.g., downlink control information (DCI), MAC control element (CE))

Figure 11:
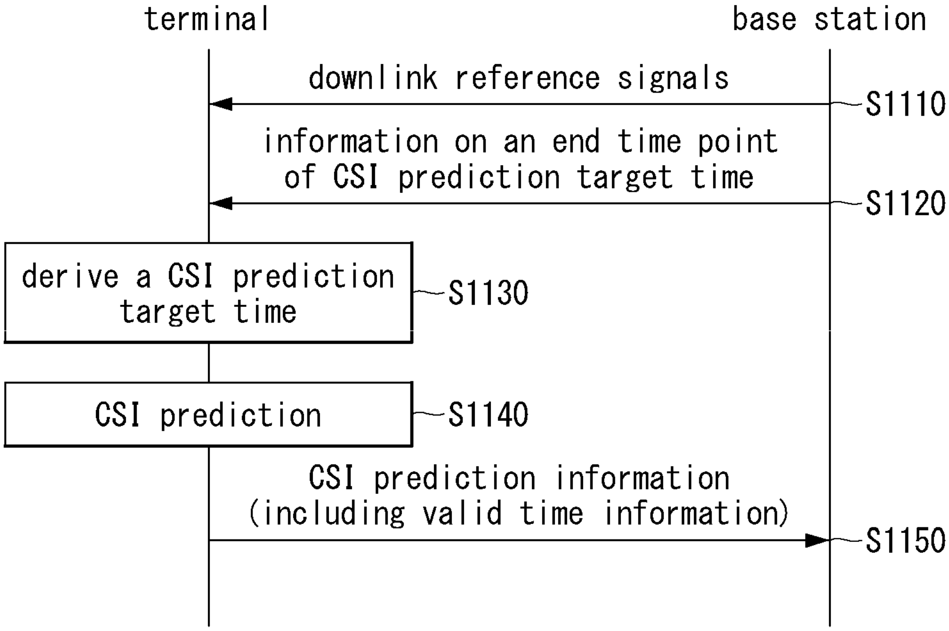
FIG. 11 is a conceptual diagram illustrating a ninth exemplary embodiment of a beam management method in a communication system.

FIG. 11 is a conceptual diagram illustrating a ninth exemplary embodiment of a beam management method in a communication system.

Referring to FIG. 11, the base station and the terminal may configure the 5G NR communication system according to the 3GPP standards. It may be assumed that base station and terminal constituting the 5G NR communication system operate in an FR2, which is a millimeter wave band. The terminal may report CSI to the base station for the purpose of supporting link adaptation according to an MCS setting of the base station, MIMO technique, and the like.

In this case, the base station may transmit a plurality of downlink reference signals (e.g., SSBs and CSI-RSs) corresponding to a plurality of beams to the terminal in a beam sweeping manner (S1110). Then, when an AI/ML, technique can be applied, the terminal may perform optimal CSI prediction for a future time point by utilizing various channel measurement information based on the downlink reference signals.

Accordingly, the base station may transmit information on a time (or time period) to be targeted for CSI prediction (hereinafter, 'CSI prediction target time') to the terminal. In this case, an explicit delivery scheme may be used as a method of delivering the CSI prediction target time information. Here, the explicit delivery scheme may be, for example, a scheme in which the base station informs the terminal of CSI prediction target period information directly indicating a relative end time point at which a CSI prediction target time ends with respect to a specific reference time point. For example, the base station may transmit reference time point configuration information to the terminal so that the terminal sets a time point at which the CSI prediction information report is triggered to the terminal as the reference time point. The terminal may receive the reference time point configuration information from the base station, and may set the time point at which the base station triggers the CSI prediction information report as the reference time point.

Thereafter, the base station may signal CSI prediction time end time point information, such as an offset for the CSI prediction target time compared to the reference time point, to the terminal (S1120). The terminal may derive the CSI prediction target time received from the base station by applying the CSI prediction target time end time point information based on the set reference time point (S1130).

As another example, the explicit delivery scheme may indicate a specific time period in the future compared to the reference time point. In the case of indicating a specific time period in the future relative to the reference time point, for example, the base station may inform the terminal of an offset for a start time point relative to the reference time point and the length of the period. Then, the terminal may receive the information on the offset for the start time point and the length of the period from the base station. The terminal may set the time point obtained by applying the offset to the reference time point as the start time point of the CSI prediction target time, and may set the time point obtained by adding the period length to the start time point as the end time point of the CSI prediction target time.

When indicating a specific time period in the future relative to the reference time point, as another example, the base station may inform the terminal of an offset for a start time point and an offset for an end time point relative to the reference time point. Then, the terminal may receive information on the offset for the start time point and the offset for the end time point from the base station. In addition, the terminal may set a time point obtained by applying one offset to the reference time point as a start time point of the CSI prediction target time, and may set a time point obtained by adding the other offset to the start time point as an end time point of the CSI prediction target time.

Thereafter, the terminal may perform optimal CSI prediction based on the beam measurement result, beam evaluation result, and information on the optimal beam(s) for the CSI prediction target time using an AI model that performs optimal CSI prediction (S1140). Thereafter, the terminal may transmit optimal CSI prediction information for the CSI prediction target time to the base station (S1150). In this case, when the terminal transmits the optimal CSI prediction information for the CSI prediction target time to the base station, information on a valid time may also be delivered to the terminal. Here, the valid time may correspond to the CSI prediction target time. Then, the base station may receive the optimal CSI prediction information and valid time information from the terminal. For example, the base station may perform scheduling on an optimal beam to be transmitted to the terminal at the valid time based on the optimal CSI prediction information for the valid time.

Meanwhile, the base station (or terminal) may transmit (optimal) beam prediction information and valid time information to the terminal (or base station). In this case, the base station (or terminal) may allow the terminal (or base station) to derive the valid time information by one or more of the following implicit schemes.

(1) After configuring periodic beam update time points between the base station and the terminal, the base station and the terminal may promise the earliest beam update time point after a time point obtained by adding a waiting time $T_{PROC}$ to a time point of receiving the beam prediction information that is a reference time point, as a valid (or application) time point for the beam prediction information.

(2) After configuring periodic beam update periods between the base station and the terminal, the base station and the terminal may promise the earliest time beam update period after a time point obtained by adding a waiting time $T_{PROC}$ to a time point of receiving the beam prediction information that is a reference time point, as a valid (or application) time period for the beam prediction information. Here, the waiting time $T_{PROC}$ may mean a waiting time considering a processing delay of the terminal. The terminal may report to the base station including information on the waiting time in terminal capability information. Accordingly, the base station may receive the terminal capability information from the terminal to identify the waiting time.

Figure 12A:
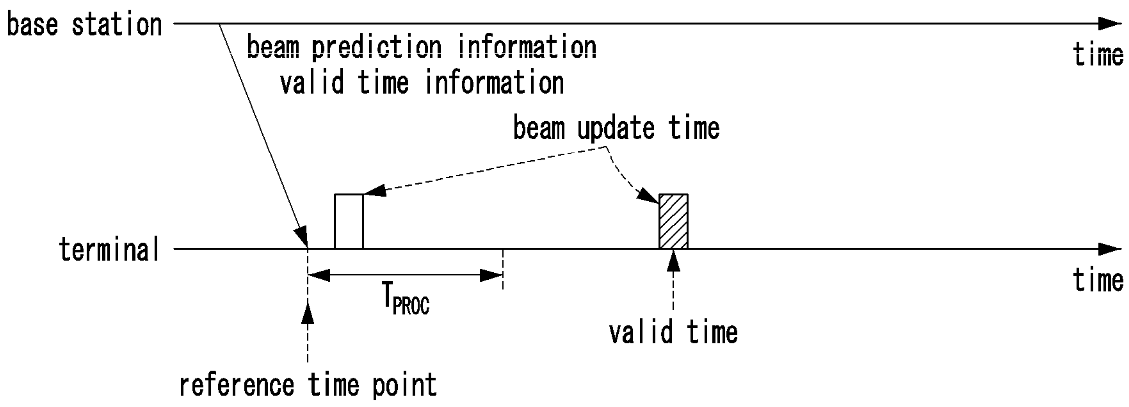
FIGS. 12A and 12B are conceptual diagrams illustrating a tenth exemplary embodiment of a beam management method in a communication system.
Figure 12B:
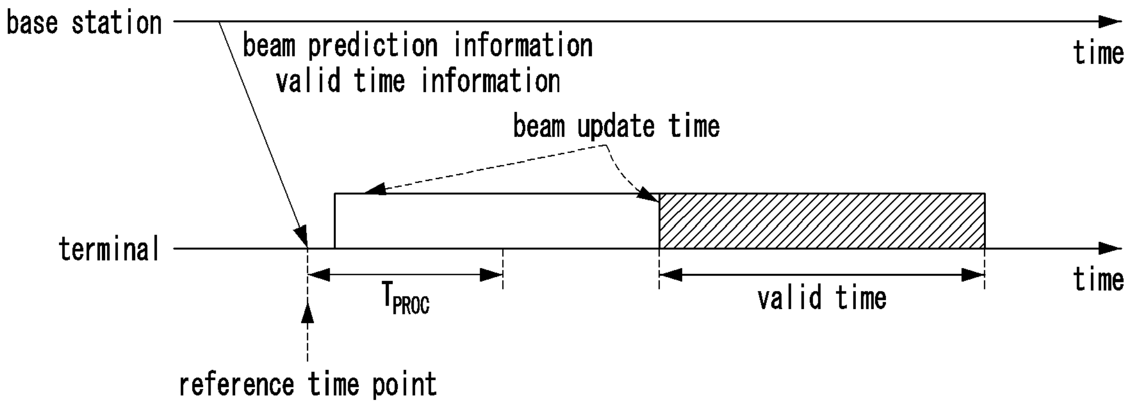

FIGS. 12A and 12B are conceptual diagrams illustrating a tenth exemplary embodiment of a beam management method in a communication system.

Referring to FIGS. 12A and 12B, the base station and the terminal may configure the NR communication system according to the 3GPP standards. It may be assumed that base station and terminal constituting the 5G NR communication system operate in an FR2, which is a millimeter wave band. In this case, the base station may transmit a plurality of downlink reference signals (e.g., SSBs and CSI-RSs) corresponding to a plurality of beams to the terminal in a beam sweeping manner. Then, the terminal may measure and evaluate the plurality of beams using the downlink reference signals, select optimal beam(s), and report the selected optimal beam(s) to the base station. In this case, the terminal may report measurement and evaluation results of the plurality of beams to the base station together.

Then, the base station may receive the measurement and evaluation results for the plurality of beams from the terminal, and may receive information on the optimal beam(s) from the terminal. Accordingly, when an AI/ML technique can be used, the base station may apply the AI/ML technique such as deep learning based on the beam measurement results, beam evaluation results, and information on the optimal beam(s) received from the terminal to predict optimal beam(s) for a future time point. In addition, the base station may generate optimal beam prediction information for the optimal beam predicted for a future time point.

The optimal beam prediction information for the future time point may be usefully utilized by the terminal. Accordingly, the base station may deliver the optimal beam prediction information to the terminal, and the terminal may receive the optimal beam prediction information from the base station. For example, the terminal may prepare a spatial filter corresponding to the optimal beam to be transmitted by the base station at the future time point based on the optimal beam prediction information for the future time point. In addition, when transmitting data based on the optimal beam prediction information for the future time point, the terminal may apply a transmit beam corresponding to the predicted optimal beam.

However, the optimal beam prediction information cannot be optimal for all times and may be optimal until a certain time. Accordingly, the base station may predict a valid time point or valid time that can be optimal for the optimal beam prediction information. In this manner, the base station may also deliver information on the valid time predicted for the optimal beam prediction information to the terminal. Accordingly, when the base station transmits the optimal beam prediction information to the terminal, the base station may inform the terminal of the valid time information for the optimal beam prediction information.

In this case, an implicit delivery scheme may be used as a method of transmitting the valid time information. Here, the implicit delivery scheme may be a scheme for allowing the terminal to derive the valid time of the beam prediction information in a pre-promised or pre-configured manner based on a specific reference time point. For example, referring to FIG. 12A, the base station may transmit reference time point configuration information to the terminal so that the terminal sets a time point at which the beam prediction information is received as the reference time point. Then, the terminal may receive the reference time point configuration information from the base station, and may set the time point at which the beam prediction information is received from the base station as the reference time point. In addition, the base station may define beam update times having a periodicity shorter than an actual beam reporting interval. The base station may inform the terminal of information on the newly defined beam update times. Then, the terminal may receive information on the newly defined beam update times from the base station.

Thereafter, the base station may transmit the beam prediction information to the terminal. Then, the terminal may receive the beam prediction information from the base station. Accordingly, the terminal may set a time point at which the beam prediction information is received as a reference time point, and may add a waiting time $T_{PROC}$ to the reference time point. Thereafter, the terminal may derive a beam update time that arrives the earliest after a time point obtained by adding the waiting time $T_{PROC}$ to the reference time point as the valid time of the received beam prediction information.

As another example, referring to FIG. 12B, the base station may transmit reference time point configuration information to the terminal so that the terminal sets a time point at which the beam prediction information is received as a reference time point. Then, the terminal may receive the reference time point configuration information from the base station, and may set the time point at which the beam prediction information is received from the base station as the reference time point. In addition, the base station may define beam update periods having a shorter periodicity than an actual beam reporting interval. The base station may inform the terminal of information on the newly defined beam update periods, and the terminal may receive information on the newly defined beam update periods from the base station.

Thereafter, the base station may transmit the beam prediction information to the terminal. Then, the terminal may receive the beam prediction information from the base station. Accordingly, the terminal may set a time point at which the beam prediction information is received as a reference time point, and may add a waiting time $T_{PROC}$ to the reference time point. Thereafter, the terminal may derive a beam update period that arrives the earliest after a time point obtained by adding the waiting time to the reference time point as a valid time period of the received beam prediction information.

Then, the terminal may prepare a spatial filter corresponding to an optimal beam to be transmitted by the base station in the valid time period based on the derived optimal beam prediction information for the valid time period. In addition, when transmitting data based on the optimal beam prediction information for the valid time period, the terminal may apply a transmit beam corresponding to the predicted optimal beam.

Here, the base station may perform beam prediction using a technique such as AI/ML, and transmit beam prediction information and valid time information of the beam prediction information to the terminal. However, the proposed method of the present disclosure may be obviously applied even in the case of an operation in which the terminal performs beam prediction using a technique such as AI/ML and transmits beam prediction information and valid time information of the beam prediction information to the base station. Alternatively, the terminal may perform beam prediction based on a beam measurement result, beam evaluation result, and information on optimal beam(s) by using a technique such as AI/ML. In addition, the terminal may transmit beam prediction information and valid time information for the beam prediction information to the base station.

Meanwhile, when the base station can indicate to the terminal information a time (or time period) to be targeted for beam prediction (i.e., beam prediction target time information), the base station may implicitly transmit the beam prediction target time information in one or more of the following scheme, so that the terminal derives the beam prediction target time information.

(1) After configuring periodic beam update time points between the base station and the terminal, the base station and the terminal may promise the earliest beam update time point after a time point obtained by adding a waiting time $T_{PROC}$ to a time point of receiving the beam prediction information that is a reference time point, as a target (or application) time point for the beam prediction information.

(2) After configuring periodic beam update periods between the base station and the terminal, the base station and the terminal may promise the earliest time beam update period after a time point obtained by adding a waiting time $T_{PROC}$ to a time point of receiving the beam prediction information that is a reference time point, as a target (or application) time period for the beam prediction information. Here, the waiting time $T_{PROC}$ may mean a waiting time considering a processing delay of the terminal. The terminal may report to the base station including information on the waiting time in terminal capability information. Accordingly, the base station may receive the terminal capability information from the terminal to identify the waiting time.

Figure 13:
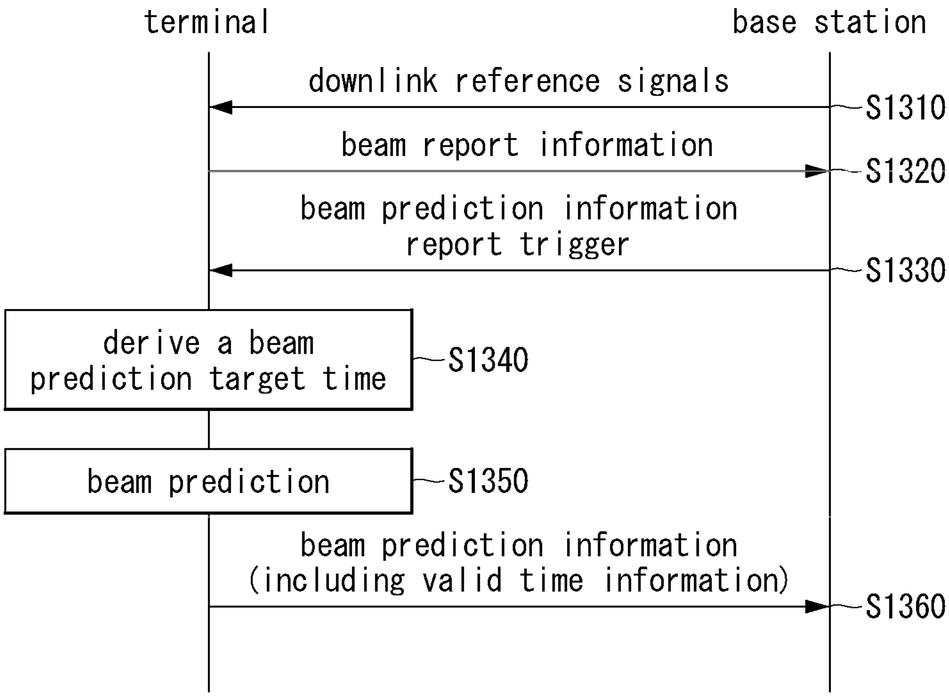
FIG. 13 is a conceptual diagram illustrating an eleventh exemplary embodiment of a beam management method in a communication system.

FIG. 13 is a conceptual diagram illustrating an eleventh exemplary embodiment of a beam management method in a communication system.

Referring to FIG. 13, the base station and the terminal may configure the 5G NR communication system according to the 3GPP standards. It may be assumed that base station and terminal constituting the 5G NR communication system operate in an FR2, which is a millimeter wave band. In this case, the base station may transmit a plurality of downlink reference signals (e.g., SSBs and CSI-RSs) corresponding to a plurality of beams to the terminal in a beam sweeping manner (S1310). Then, the terminal may measure and evaluate the plurality of beams using the downlink reference signals, select optimal beam(s), and report the selected optimal beam(s) to the base station. In this case, the terminal may report measurement and evaluation results of the plurality of beams to the base station together (S1320).

In this case, when the terminal can apply an AI/ML technique, the terminal may perform optimal beam prediction for a future time point by utilizing various channel measurement information based on the downlink reference signals. Accordingly, the base station may transmit information on a time (or time period) to be targeted for beam prediction (hereinafter, 'beam prediction target time') to the terminal.

In this case, an implicit delivery scheme may be used as a method of transmitting the beam prediction target time information. Here, the implicit delivery scheme may be a scheme for allowing the terminal to derive the beam prediction target time in a pre-promised or pre-configured manner based on a specific reference time point. For example, the base station may transmit reference time point configuration information to the terminal so that the terminal sets a time point at which the beam prediction information report is triggered as the reference time point. Then, the terminal may the receive reference time point configuration information from the base station, and may set the time point at which the beam prediction information report is triggered by the base station as the reference time point. In addition, the base station may define beam update time points having a periodicity shorter than an actual beam reporting interval. The base station may inform the terminal of information on the newly defined beam update time points. Then, the terminal may receive information on the newly defined beam update time points from the base station.

Accordingly, the base station may transmit a downlink signal including a beam prediction information report trigger to the terminal (S1330). Then, the terminal may receive the downlink signal including the beam prediction information report trigger from the base station. Thereafter, the terminal may set a time point at which the beam prediction information report is triggered as a reference time point, and may add the waiting time $T_{PROC}$ to the reference time point. The terminal may derive a time until a beam update time that arrives the earliest after a time point obtained by adding the waiting time to the reference time point as the beam prediction target time (S1340).

As another example, the base station may transmit reference time point configuration information to the terminal so that the terminal sets a time point at which the beam prediction information report is triggered as a reference time point. Then, the terminal may receive the reference time point configuration information from the base station, and may set the time point at which the beam prediction information report is triggered by the base station as the reference time point. In addition, the base station may define beam update periods having a shorter periodicity than an actual beam reporting interval. The base station may inform the terminal of information on the newly defined beam update periods, and the terminal may receive information on the newly defined beam update periods from the base station. Accordingly, the terminal may set the time point at which the beam prediction information report is triggered as the reference time point, and may add the waiting time $T_{PROC}$ to the reference time point. Thereafter, the terminal may derive a beam update period that arrives the earliest after a time point obtained by adding the waiting time to the reference time point in time as the beam prediction target period.

In addition, the terminal may perform optimal beam prediction based on the beam measurement result, beam evaluation result, and information on the optimal beam(s) for the beam prediction target time using an AI model that performs optimal beam prediction (S1350). Thereafter, the terminal may transmit optimal beam prediction information for the beam prediction target time to the base station (S1360). In this case, when the terminal transmits the optimal beam prediction information for the beam prediction target time to the base station, the terminal may also transmit information on a valid time to the terminal. Here, the valid time may correspond to the beam prediction target time. Then, the base station may receive the optimal beam prediction information and valid time information from the terminal. For example, the base station may perform scheduling on an optimal beam to be transmitted to the terminal at the valid time based on the optimal beam prediction information for the valid time.

Meanwhile, when the base station can indicate to the terminal information on a time (or time period) to be targeted for CSI prediction ('CSI prediction target time information'), the base station may implicitly transmit the CSI prediction target time information in one or more of the following schemes, so that the terminal derives the CSI prediction target time information.

(1) After configuring periodic CSI update time points between the base station and the terminal, the base station and the terminal may promise the earliest CSI update time point after a time point obtained by adding a waiting time $T_{PROC}$ to a time point of receiving the CSI prediction information that is a reference time point, as a target (or application) time point for the CSI prediction information.

(2) After configuring periodic CSI update periods between the base station and the terminal, the base station and the terminal may promise the earliest time CSI update period after a time point obtained by adding a waiting time $T_{PROC}$ to a time point of receiving the CSI prediction information that is a reference time point, as a target (or application) time period for the CSI prediction information. Here, the waiting time $T_{PROC}$ may mean a waiting time considering a processing delay of the terminal. The terminal may report to the base station including information on the waiting time in terminal capability information. Accordingly, the base station may receive the terminal capability information from the terminal to identify the waiting time.

Figure 14:
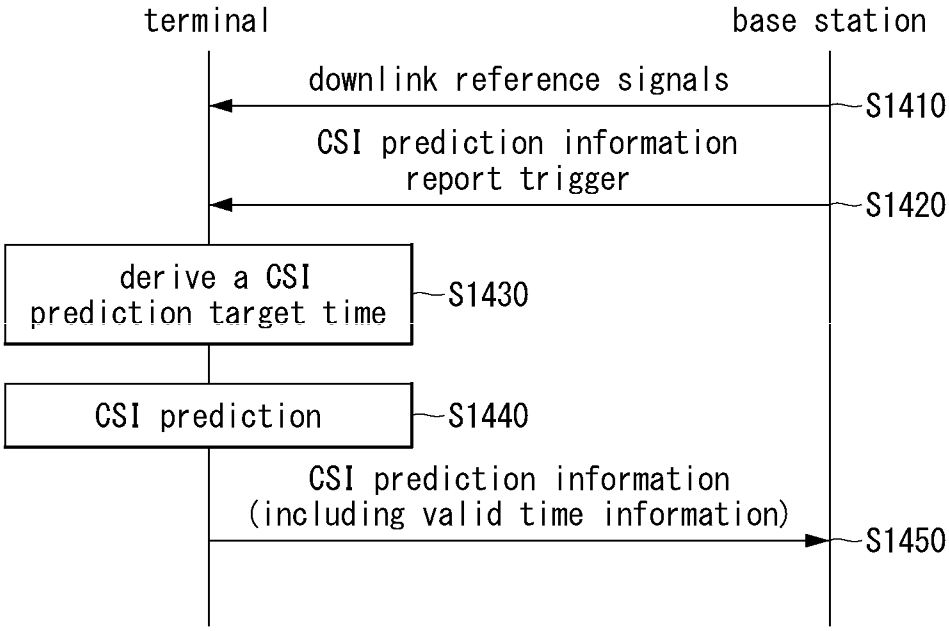
FIG. 14 is a conceptual diagram illustrating a twelfth exemplary embodiment of a beam management method in a communication system.

FIG. 14 is a conceptual diagram illustrating a twelfth exemplary embodiment of a beam management method in a communication system.

Referring to FIG. 14, the base station and the terminal may configure the 5G NR communication system according to the 3GPP standards. It may be assumed that base station and terminal constituting the 5G NR communication system operate in an FR2, which is a millimeter wave band. The terminal may report CSI to the base station for the purpose of supporting link adaptation according to an MCS setting of the base station, MIMO technique, and the like.

In this case, the base station may transmit a plurality of downlink reference signals (e.g., SSBs and CSI-RSs) corresponding to a plurality of beams to the terminal in a beam sweeping manner (S1410). Then, when an AI/ML technique can be applied, the terminal may perform optimal CSI prediction for a future time point by utilizing various channel measurement information based on the downlink reference signals.

Accordingly, the base station may transmit information on a time (or time period) to be targeted for CSI prediction (hereinafter, 'CSI prediction target time') to the terminal. In this case, an explicit delivery scheme may be used as a method of delivering the CSI prediction target time information. Here, the explicit delivery scheme may be, for example, a scheme in which the terminal derives the CSI prediction target time based on a specific reference time point in a pre-promised/pre-configured manner. For example, the base station may transmit reference time point configuration information to the terminal so that the terminal sets a time point at which the CSI prediction information report is triggered as the reference time point. Then, the terminal may receive the reference time point configuration information from the base station, and may set the time point at which the CSI prediction information report is trigged by the base station as the reference time point. In addition, the base station may define CSI update time points having a periodicity shorter than an actual beam reporting interval. The base station may inform the terminal of information on the newly defined CSI update time points. Then, the terminal may receive information on the newly defined CSI update time points from the base station.

Accordingly, the base station may transmit a downlink signal including a CSI prediction information report trigger to the terminal (S1420). Then, the terminal may receive the downlink signal including the CSI prediction information report trigger from the base station. The terminal may set a time point at which the CSI prediction information report is triggered as a reference time point, and may add the waiting time $T_{PROC}$ to the reference time point. The terminal may derive a time until a CSI update time point that arrives the earliest after a time point obtained by adding the waiting time to the reference time point as the CSI prediction target time (S1430).

As another example, the base station may transmit reference time point configuration information to the terminal so that the terminal sets a time point at which the CSI prediction information report is triggered as a reference time point. Then, the terminal may receive the reference time point configuration information from the base station, and may set the time point at which the CSI prediction information report is triggered by the base station as the reference time point. In addition, the base station may define CSI update periods having a shorter periodicity than an actual beam reporting interval. The base station may inform the terminal of information on the newly defined CSI update periods, and the terminal may receive information on the newly defined CSI update periods from the base station. Accordingly, the terminal may set the time point at which the CSI prediction information report is triggered as the reference time point, and may add the waiting time $T_{PROC}$ to the reference time point. Thereafter, the terminal may derive a CSI update period that arrives the earliest after a time point obtained by adding the waiting time to the reference time point in time as the CSI prediction target period.

In addition, the terminal may perform optimal CSI prediction based on the channel information for the CSI prediction target time using an AI model that performs optimal CSI prediction (S1440). Thereafter, the terminal may transmit optimal CSI prediction information for the CSI prediction target time to the base station (S1450). In this case, when the terminal transmits the optimal CSI prediction information for the CSI prediction target time to the base station, the terminal may also transmit information on a valid time to the terminal. Here, the valid time may correspond to the CSI prediction target time. Then, the base station may receive the optimal CSI prediction information and valid time information from the terminal. For example, the base station may perform scheduling on an optimal beam to be transmitted to the terminal at the valid time based on the optimal CSI prediction information for the valid time.

Meanwhile, the base station (or terminal) may encode the (optimal) beam prediction information and valid time period information using one or more of the following schemes, and transmit them to the terminal (or base station).

(1) Separate Encoding Scheme

A. A scheme of configuring a first field indicating the (optimal) beam prediction information and a second field indicating the valid time period of the (optimal) beam prediction information indicated by the first field B. A scheme of configuring a first field indicating the valid time interval and a second field indicating the (optimal) beam prediction information for the valid time period indicated by the first field (2) Joint Encoding Scheme A. A scheme of jointly encoding the (optimal) beam prediction information and the valid time period information to configure a single field As an exemplary embodiment of the present disclosure, the 5G NR system according to the 3GPP standards may operate in an FR2, which is a millimeter wave band. In addition, the 5G NR system may perform optimal beam prediction for a future time point by applying an AI/ML technique such as deep learning at the base station. In this case, the base station may transmit information on a valid time for optimal beam prediction information to the terminal together with the optimal beam prediction information. The base station may encode the optimal beam prediction information and the valid time information for the beam prediction information and transmit them through the same physical channel. In this case, the base station may separately encode each piece of information. Alternatively, the base station may jointly encode the optimal beam prediction information and the valid time information for the beam prediction information into one.

FIG. 15 is a conceptual diagram illustrating a first exemplary embodiment of a method of encoding beam prediction information and valid time information.

Referring to FIG. 15, the base station may separately encode the beam prediction information and the valid time information, and configure a first field indicating the (optimal) beam prediction information and a second field indicating the valid time period for the (optimal) beam prediction information indicated by the first field. Here, the beam prediction information may include identifier(s) of predicted beam(s) (e.g., $B_1$, $B_2$, etc.), and the valid time information may include valid times (e.g., $T_1$, $T_2$, etc.) for the respective prediction beams. FIG. 16 is a conceptual diagram illustrating a second exemplary embodiment of a method of encoding beam prediction information and valid time information.

Referring to FIG. 16, the base station may separately encode the beam prediction information and the valid time information, and configure a first field indicating the valid time period and a second field indicating the (optimal) beam prediction information for the valid time period indicated by the first field. Here, the beam prediction information may include identifier(s) of predicted beam(s) (e.g., $B_1$, $B_2$, etc.), and the valid time information may include valid times (e.g., $T_1$, $T_2$, etc.) for the respective prediction beams.

FIG. 17 is a conceptual diagram illustrating a third exemplary embodiment of a method of encoding beam prediction information and valid time information.

Referring to FIG. 17, the base station may jointly encode the (optimal) beam prediction information and the valid time period information, and configure them into a single field. Here, the beam prediction information may include identifier(s) of predicted beam(s) (e.g., $B_1$, $B_2$, etc.), and the valid time information may include valid times (e.g., $T_1$, $T_2$, etc.) for the respective prediction beams.

Meanwhile, FIGS. 15 to 17 may correspond to operations in which the base station performs beam prediction using a technique such as AI/ML, and transmits beam prediction information and valid time information for the beam prediction information to the terminal. However, the proposed method of the present disclosure may be obviously applied even in the case of an operation in which the terminal performs beam prediction using a technique such as AI/ML and transmits beam prediction information and valid time information for the beam prediction information to the base station.

(1) Configuration through a higher layer signal (2) Indication through a dynamic control signal As an exemplary embodiment of the present disclosure, the 5G NR system according to the 3GPP standards may operate in an FR2, which is a millimeter wave band. In addition, the 5G NR system may perform optimal beam prediction for a future time point by applying an AI/ML technique such as deep learning at the base station. In this case, the base station may configure whether to use beam prediction information for each physical channel through which data is transmitted and received between the base station and the terminal.

Figure 18:
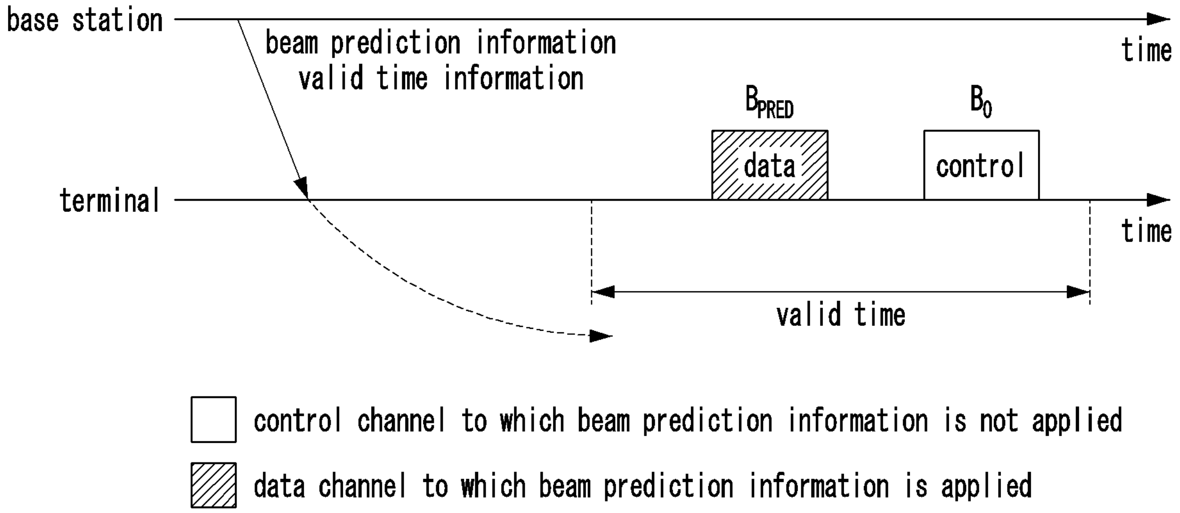
FIG. 18 is a conceptual diagram illustrating a first exemplary embodiment of a method of applying beam prediction information to a channel.

FIG. 18 is a conceptual diagram illustrating a first exemplary embodiment of a method of applying beam prediction information to a channel.

Referring to FIG. 18, the base station may transmit, to the terminal and through a higher layer signal and/or dynamic control signal, a beam prediction information application indication signal for instructing the terminal to configure beam prediction information to be applied to a data channel $B_{PRED}$ for which transmission capacity is prioritized, such as a physical downlink shared channel (PDSCH) and a physical uplink shared channel (PUSCH). Then, the terminal may receive the beam prediction information application indication signal for applying the beam prediction information to the data channel. Accordingly, the terminal may apply the beam prediction information to the data channel.

On the other hand, the base station may transmit, to the terminal and through a higher layer signal and/or dynamic control signal, a beam prediction information non-application indication signal for instructing the terminal to configure beam prediction information not to be used for a control channel $B_0$ for which reliability is prioritized, such as a physical downlink control channel (PDCCH) and a physical uplink control channel (PUCCH). Then, the terminal may receive the beam prediction information non-application indication signal for not applying the beam prediction information to the control channel. Accordingly, the terminal may not apply the beam prediction information to the control channel.

Here, in FIG. 18, the base station may perform beam prediction using a technique such as AI/ML, and transmit beam prediction information and valid time information for the beam prediction information to the terminal. However, the proposed method of the present disclosure may be obviously applied even in the case of an operation in which the terminal performs beam prediction using a technique such as AI/ML and transmits beam prediction information and valid time information for the beam prediction information to the base station.

Meanwhile, the terminal may report a support capability for (optimal) beam prediction information to the base station as a part of the terminal capability. As an exemplary embodiment of the present disclosure, the 5G NR system according to the 3GPP standards may operate in an FR2, which is a millimeter wave band. The 5G NR system may perform optimal beam prediction for a future time point by applying an AI/ML technique such as deep learning at the base station (or terminal). The base station may have a capability to perform optimal beam prediction. In this case, in order for the base station to configure beam prediction-related information to the terminal, the base station may need to know whether the terminal supports a beam prediction function. Accordingly, the terminal may report whether or not the terminal supports beam prediction information to the base station (or network) by including it in terminal (UE) capability information. Then, the base station (or network) may receive the terminal capability information from the terminal and identify whether the terminal supports the use of the beam prediction information from the received terminal capability information. If the terminal is identified as a terminal to which beam prediction information can be applied, the base station (or terminal) may operate to configure beam prediction and beam prediction information to the terminal.

Meanwhile, when one or more of the following conditions are satisfied, the terminal (or base station) may apply the (optimal) beam prediction information to a transmit beam or a receive beam.

(1) A case when valid (optimal) beam prediction information exists at a time of transmission or reception (2) A case when application of (optimal) beam prediction information is configured for a physical channel to be transmitted or received As an exemplary embodiment of the present disclosure, the 5G NR system according to the 3GPP standards may operate in an FR2, which is a millimeter wave band. In addition, the 5G NR system may perform optimal beam prediction for a future time point by applying an AI/ML technique such as deep learning at the base station (or terminal). In this situation, the base station may transmit valid time information for (optimal) beam prediction information to the terminal together with the (optimal) beam prediction information. Accordingly, the terminal may receive the (optimal) beam prediction information and the valid time information of the beam prediction information from the base station.

The base station may transmit, to the terminal and through a higher layer signal and/or dynamic control signal, a beam prediction information application indication signal for instructing the terminal to configure beam prediction information to be applied to a data channel for which transmission capacity is prioritized, such as PDSCH and PUSCH. Then, the terminal may receive the beam prediction information application indication signal for applying the beam prediction information to the data channel.

On the other hand, the base station may transmit, to the terminal and through a higher layer signal and/or dynamic control signal, a beam prediction information non-application indication signal for instructing the terminal to configure beam prediction information not to be used for a control channel for which reliability is prioritized, such as PDCCH and PUCCH. Then, the terminal may receive the beam prediction information non-application indication signal for not applying the beam prediction information to the control channel.

In this case, when transmitting or receiving a specific physical channel, the terminal may be configured to utilize beam prediction information for a physical channel, and may apply the beam prediction information to a transmit beam or receive beam only when valid beam prediction information exists at a time of transmitting or receiving the physical channel.

For example, when the terminal receives a data channel such as PDSCH, if the application of beam prediction information to the corresponding physical channel is configured, but valid beam prediction information does not exist at the time of data reception, the terminal may not utilize the beam prediction information. Accordingly, the terminal may determine a receive beam by assuming a transmit beam previously configured by the base station (or network). If valid beam prediction information exists at the time of data reception, the terminal may determine a receive beam by assuming that data is transmitted through a transmit beam predicted through the beam prediction information.

Meanwhile, in the mobile communication system, the base station may predict a layer 1 (L1) reference signal received power (RSRP) of a serving beam (or currently connected beam) for a future time point. Accordingly, the base station may predict a beam failure at a future time point, and may inform the terminal of information on a predicted beam failure time point. Accordingly, the terminal may perform one or more of the following operations at the predicted beam failure time point notified by the base station.

(1) The terminal may wake up at (or before or after) the corresponding time point, and monitor a downlink control signal (e.g. PDCCH).

A. The terminal may wake up ignoring a discontinuous reception (DRX) cycle.

(2) The terminal may wake up at the corresponding time point (or nearby time point), and transmit an uplink control signal (e.g. PUCCH).

A. Option 1: The terminal may transmit a scheduling request (SR) requesting a beam report resource through the uplink control signal.

B. Option 2: The terminal may transmit beam report information through the uplink control signal.

(3) The terminal may wake up at the corresponding time point (or nearby time point), and transmit an uplink data signal (e.g., PUSCH).

A. Option 1: The terminal may transmit beam report information through the uplink data signal.

Here, the beam failure may refer to a case where an L1 RSRP for a beam is less than or equal to a predetermined strength. In addition, when the terminal wakes up at (or before or after) the corresponding beam failure time point, the terminal may wake up ignoring a DRX cycle.

Figure 19:
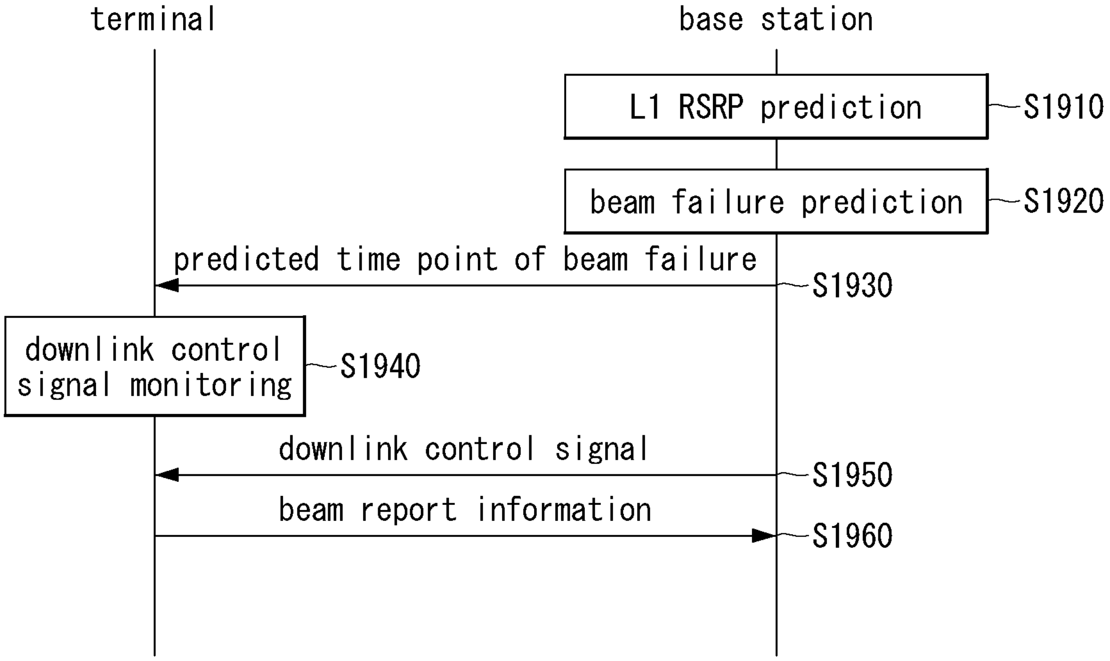
FIG. 19 is a sequence chart illustrating a first exemplary embodiment of a wake-up method of a terminal in a communication system.

FIG. 19 is a sequence chart illustrating a first exemplary embodiment of a wake-up method of a terminal in a communication system.

Referring to FIG. 19, the 5G NR system according to the 3GPP standards may operate in an FR2, which is a millimeter wave band. In the 5G NR system, the base station may predict an L1 RSRP of a serving beam or a currently connected beam for a future time point by applying an AI/ML technique such as deep learning (S1910). In this case, the base station may predict a beam failure in which the L1 RSRP is less than a predetermined strength of an expected level that can guarantee reliable link performance at a specific future time point (S1920).

The base station may transmit a predicted time point of beam failure to the terminal (S1930). The terminal may receive the predicted time point of beam failure from the base station. In this case, the terminal may transition from an active state to a sleep state. In addition, the terminal may prepare a beam report for selecting a new optimal beam before and after the predicted time point of beam failure based on the received predicted time point of beam failure. For example, the terminal may transition to a wake-up state (i.e., wake up) at (or before or after) the predicted time point of beam failure, and monitor a downlink control signal including a beam report trigger from the base station (S1940). Accordingly, the base station may transmit a downlink control signal including a beam report trigger to the terminal (S1950). The terminal may receive the downlink control signal including the beam report trigger from the base station, and may transmit a beam report information signal to the base station (S1960). Then, the base station may receive the beam report information signal from the terminal. Meanwhile, the terminal may wake up at (or, before or after) the predicted time point of beam failure and transmit a beam report resource request or beam report information using an uplink control resource or data resource previously agreed with the base station. Accordingly, the base station and the terminal may prevent the beam failure by appropriately performing beam reporting at the predicted time point of beam failure.

Meanwhile, the terminal may predict a reception strength of a serving beam (or currently connected beam) for a future time point. Accordingly, the terminal may report information on a predicted time point of beam failure to the base station. The terminal may perform one or more of the following operations at the predicted time point of beam failure reported to the base station.

(1) The terminal may wake up at (or before or after) the corresponding time point, and monitor a downlink control signal (e.g. PDCCH).

(2) The terminal may wake up at (or, before or after) the corresponding time point, and transmit an uplink control signal (e.g. PUCCH).

A. Option 1: The terminal may transmit an SR requesting a beam report resource through the uplink control signal.

B. Option 2: The terminal may transmit beam report information through the uplink control signal.

(3) The terminal may wake up at the corresponding time point (or nearby time point), and transmit an uplink data signal (e.g., PUSCH).

Here, the beam failure may refer to a case where an L1 RSRP for a beam is less than or equal to a predetermined strength. In addition, when the terminal wakes up at (or before or after) the corresponding beam failure time point, the terminal may wake up ignoring a DRX cycle.

Figure 20:
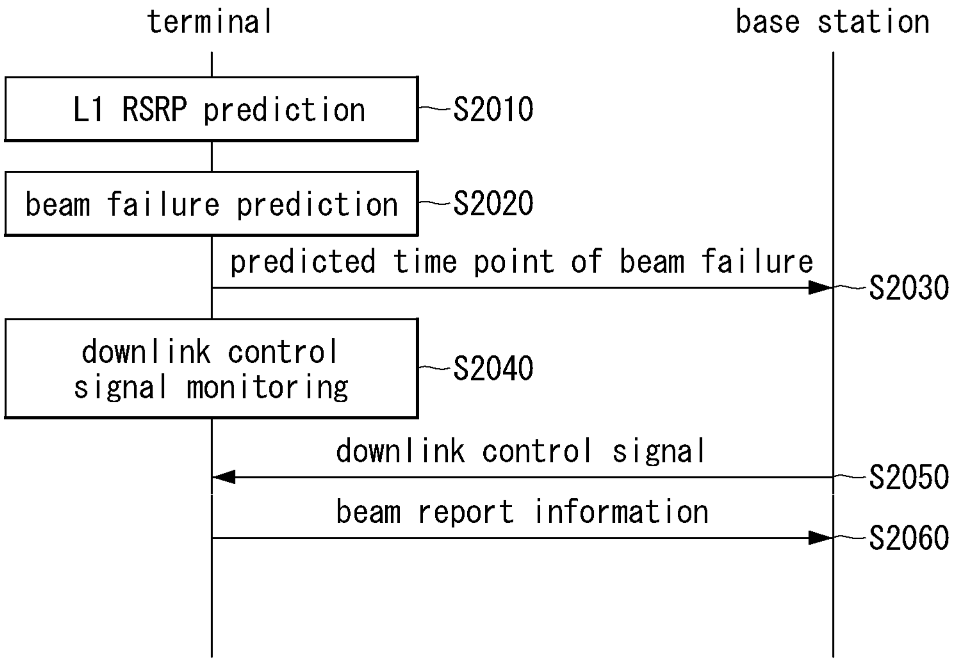
FIG. 20 is a sequence chart illustrating a second exemplary embodiment of a wake-up method of a terminal in a communication system.

FIG. 20 is a sequence chart illustrating a second exemplary embodiment of a wake-up method of a terminal in a communication system.

Referring to FIG. 20, the 5G NR system according to the 3GPP standards may operate in an FR2, which is a millimeter wave band. In the 5G NR system, a terminal may predict an L1 RSRP of a serving beam or currently connected beam for a future time point by applying an AI/ML technique such as deep learning (S2010). In this case, the terminal may predict a beam failure in which the L1 RSRP becomes smaller than an expected level that can guarantee reliable link performance at a specific future time point (S2020).

When a beam failure is predicted, the terminal may transmit information on a predicted time point of beam failure to the base station (S2030). Then, the base station may receive information on the predicted time point of beam failure from the terminal. In this case, the terminal may transition from the active state to the sleep state. Meanwhile, after reporting the predicted time point of beam failure, the terminal may prepare a beam report for selecting a new optimal beam before and after the predicted time point. For example, the terminal may transition to the wake-up state (i.e., wake up) at (or, before or after) the predicted time point of beam failure, and monitor a downlink control signal including a beam report trigger from the base station (S2040). Accordingly, the base station may transmit a downlink control signal including a beam report trigger to the terminal (S2050). Then, the terminal may receive the downlink control signal including the beam report trigger from the base station, and accordingly transmit a beam report information signal to the base station (S2060). The base station may receive the beam report information signal from the terminal. Meanwhile, the terminal may transition to the wake-up state (i.e., wake up) at (or, before or after) the predicted time point of beam failure, and transmit a beam report resource request or beam report information using an uplink control resource or data resource previously agreed with the base station. Accordingly, the base station and the terminal may prevent the beam failure by appropriately performing beam reporting at the predicted time point of beam failure.

Meanwhile, the base station may inform the terminal of information on when to wake up (or when to perform PDCCH monitoring) in one or more of the following schemes.

(1) The base station may instruct the terminal to wake up (or perform PDCCH monitoring) at a specific time point or time period in the future compared to the current time point.

(2) The base station may instruct the terminal to wake up (or perform PDCCH monitoring) in one or more DRX on-durations in the future compared to the current time point.

A. For example, the base station may inform the terminal whether to wake up or not in an N-th DRX on-duration through an N-th bit of a bitmap within a (dynamic) control signal. Here, waking up of the terminal may mean that the terminal releases a DRX operation. Alternatively, waking up of the terminal may mean performing PDCCH monitoring.

Figure 21:
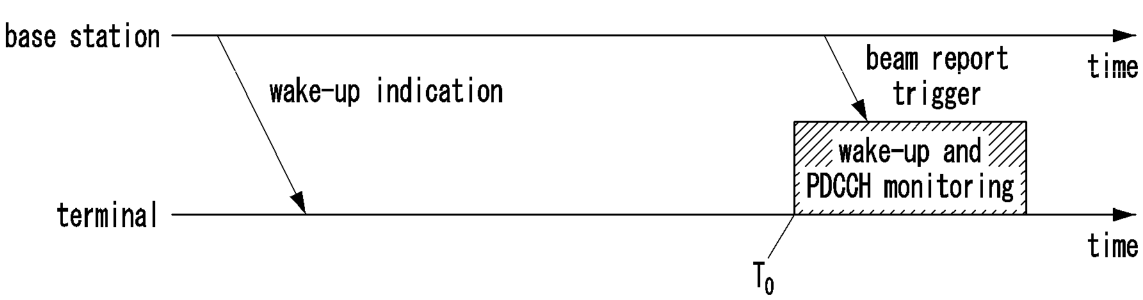
FIG. 21 is a sequence chart illustrating a third exemplary embodiment of a wake-up method of a terminal in a communication system.

FIG. 21 is a sequence chart illustrating a third exemplary embodiment of a wake-up method of a terminal in a communication system.

Referring to FIG. 21, the 5G NR system according to the 3GPP standards may operate in an FR2, which is a millimeter wave band. In the 5G NR system, a base station or terminal may predict an L1 RSRP of a serving beam or currently connected beam for a future time point by applying an AI/ML technique such as deep learning. The predicted L1 RSRP may become smaller than an expected level that can guarantee reliable link performance at a specific future time point. If the predicted L1 RSRP becomes smaller than the expected level at a specific future time point, the base station may predict an occurrence of beam failure at the future time point.

In general, a commercial terminal may perform a DRX operation of monitoring a PDCCH, which is a downlink control signal, intermittently on a time axis to reduce power consumption. In this case, the terminal may be in the sleep state (or a state in which a PDCCH is not monitored) by the DRX operation at a future time point for which a beam failure is predicted. As a result, the base station cannot instruct the terminal to perform beam reporting and beam configure beam before a beam failure occurs. Therefore, the base station may instruct the terminal to release the DRX operation as needed.

The base station may transmit to the terminal a wake-up indication signal including information on a wake-up time point (e.g., TO) or information on a wake-up time period (e.g., a start time point and an end time point of the wake-up time period) so that the terminal flexibly transitions to the wake-up state (i.e., wakes up or performs PDCCH monitoring) at a specific future time point or time period relative to the current time point. The, the terminal may receive the wake-up indication signal, and accordingly wake up at the wake-up time point to monitor a PDCCH. Alternatively, the terminal may monitor a PDCCH by maintaining the wake-up state during the wake-up time period.

On the other hand, the base station may transmit to the terminal a wake-up indication signal including information on wake-up DRX on-duration(s) so that the terminal wakes up (or performs PDCCH monitoring) in one or more DRX on-durations relative to the current time point. For example, the base station may indicate to the terminal whether to wake up or fall asleep in an N-th DRX on-duration through an N-th bit of a bitmap within a (dynamic) control signal. In this case, if the N-th bit of the bitmap is set to 1, the terminal may wake up in the N-th DRX on-duration. Accordingly, the terminal may receive the wake-up indication signal including information on wake-up DRX on-duration(s) from the base station. Accordingly, the terminal may monitor a PDCCH by maintaining the wake-up state during the wake-up DRX on-duration(s).

Meanwhile, the base station may perform (optimal) beam prediction for a future time point. When performing beam reporting, the terminal may report information on a transmit beam of the base station and information on a receive beam of the terminal, which corresponds to the transmit beam of the base station, to the base station. The base station may perform prediction on an (optimal) transmit beam of the base station and a reception beam of the terminal. The base station may inform the terminal of (optimal) beam prediction information in one or more of the following schemes.

(1) The base station may indicate an (optimal) receive beam of the terminal for a future time point to the terminal.

(2) The base station may indicate an (optimal) transmit beam of the base station for a future time point to the terminal, and may indicate a receive beam of the terminal corresponding to the transmit beam of the base station to the terminal.

Here, information on the receive beam may include a receive beam ID. In addition, the receive beam may mean a receive beam of the terminal, which is recommended to the terminal. In this case, the terminal may not necessarily apply the receive beam of the terminal. That is, a final decision may depend on the implementation of the terminal.

As an exemplary embodiment of the present disclosure, the 5G NR system according to the 3GPP standards may operate in an FR2, which is a millimeter wave band. The base station (or terminal) may perform optimal beam prediction for a future time point by applying an AI/ML technique such as deep learning. The base station may transmit valid time information for (optimal) beam prediction information together with the (optimal) beam prediction information to the terminal. Accordingly, the terminal may receive the optimal beam prediction information and the valid time information for the beam prediction information from the base station.

Here, the optimal beam prediction information may be prediction of a transmit beam of the base station. Alternatively, the optimal beam prediction information may be composed of information on a transmit beam of the base station and a receive beam information of the terminal corresponding thereto. In the latter case, the base station may perform prediction on a pair of the transmit beam of the base station and the receive beams of the terminal. To this end, the base station may receive a report of information on a receive beam of the terminal for each transmit beam of the base station, which is applied by the terminal, from the terminal. Thereafter, the base station may transmit to the terminal information of a receive beam of the terminal predicted for a future time point. In this case, the base station may inform the terminal of the terminal's (optimal) receive beam for a future time point. Accordingly, the terminal may receive information on the receive beam of the terminal from the base station, and apply the receive beam of the terminal at the future time point. Alternatively, the base station may inform the terminal of information on a pair of an (optimal) transmit beam of the base station and an (optimal) receive beam of the terminal corresponding thereto for a future time point. Accordingly, the terminal may receive information on the (optimal) transmit beam of the base station and the corresponding (optimal) receive beam of the terminal from the base station, and apply the receive beam of the terminal at the future time point.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a terminal, comprising:

receiving downlink reference signals from a base station;

generating beam report information based on the downlink reference signals, and transmitting the beam report information to the base station;

receiving information based on at least one beam prediction target time from the base station;

performing beam prediction for the at least one beam prediction target time; and transmitting beam prediction information according to the beam prediction to the base station, wherein the beam prediction information includes beam prediction information for each of the at least one beam prediction target time.

2. The method according to claim 1, wherein the information based on the at least one beam prediction target time includes at least one of a start offset, a valid time period, an end offset, or a specific offset with respect to a reference time.

3. The method according to claim 1, further comprising: sharing, with the base station, periodical beam update time points, wherein the information based on the at least one beam prediction target time includes configuration information indicating an earliest beam update time point after a time point obtained by adding a waiting time to a time point of receiving a beam prediction report trigger signal, or configuration information on an earliest beam update period after the time point obtained by adding the waiting time to the time point of receiving the beam prediction report trigger signal.

4. The method according to claim 1, further comprising:

receiving information on a prediction target time for channel state information from the base station;

predicting the channel state information for the prediction target time; and transmitting the predicted channel state information to the base station.

5. The method according to claim 1, further comprising:

predicting a layer 1 (L1) reference signal received power (RSRP) for a serving beam of the base station;

predicting a beam failure based on the predicted L1 RSRP;

transmitting information on a predicted time for the predicted beam failure to the base station; and monitoring a downlink control signal based on the predicted time.

6. The method according to claim 1, wherein the beam prediction information includes instance indicator information indicating a specific one of the at least one beam prediction target time having an optimal beam prediction.

7. The method according to claim 1, wherein the beam prediction information includes valid time information for an optimal predicted beam, and the valid time information is indicated as a relative time with respect to a reference time.

8. The method according to claim 7, further comprising preparing, based on the valid time information, a spatial filter corresponding to the optimal predicted beam to be transmitted by the base station at a valid time.

9. The method according to claim 7, further comprising transmitting data to the base station by applying, at a valid time, a transmission beam corresponding to the optimal predicted beam based on the valid time information of the beam prediction information.

10. The method according to claim 1, wherein the beam prediction information includes valid time information for an optimal predicted beam, and the valid time information is indicated in one of a pre-promised manner or a pre-configured manner based on a reference time.

11. The method according to claim 10, wherein the reference time is at least one of: a time at which the base station triggers a beam prediction report for the terminal, a time at which the terminal reports the beam prediction information to the base station, a reception time of a control signal preceding the reporting of the beam prediction information by the terminal to the base station, or a reception time of a control signal transmitted by the base station for feedback after receiving the beam prediction information.

12. The method according to claim 1, wherein the beam prediction information further includes information indicating a specific beam prediction target time having an optimal beam quality among the at least one beam prediction target time.

13. The method according to claim 1, wherein the terminal implicitly derives a valid time for the beam prediction information based on a specific reference time point according to at least one of a pre-promised manner or a pre-configured manner, and wherein the terminal determines that the beam prediction information is valid within a range defined by a pre-configured offset from the specific reference time point.

14. The method according to claim 13, further comprising:

preparing a spatial filter corresponding to the beam prediction information, based on the determination that the beam prediction information is valid; and applying the spatial filter, based on the determination that the beam prediction information is valid.

* * * * *